United States Patent [19]
McCarthy et al.

[11] Patent Number: 6,014,468
[45] Date of Patent: Jan. 11, 2000

[54] APPARATUS AND METHODS FOR IMAGE AND SIGNAL PROCESSING

[75] Inventors: Sean T. McCarthy; William G. Owen, both of Berkeley, Calif.

[73] Assignee: The Regents of the University of California, Oakland, Calif.

[21] Appl. No.: 09/126,666

[22] Filed: Jul. 30, 1998

Related U.S. Application Data

[60] Provisional application No. 60/054,399, Jul. 31, 1997.

[51] Int. Cl.$^7$ .................................. G06K 9/40; G06T 5/00
[52] U.S. Cl. ........................... 382/254; 382/260; 382/275
[58] Field of Search ..................................... 382/260, 263, 382/264, 261, 266, 269, 275, 254; 358/447, 448, 463; 348/607, 618, 619, 620, 622, 625

[56] References Cited

U.S. PATENT DOCUMENTS

| 5,500,685 | 3/1996 | Kokaram ................................. | 382/275 |
| 5,550,935 | 8/1996 | Erdem et al. ........................... | 382/260 |
| 5,694,484 | 12/1997 | Cottrell et al. ......................... | 382/167 |

OTHER PUBLICATIONS

Peskins, C.S., et al., "How to See in the Dark: Photon Noise in Vision and Nuclear Medicine, " Annals NY Acad. Sci., 435:48–72 (1984).
Pierre, D.A., "Wiener–Hopf Spectrum Factorization and Frequency Domain Optimization, " Chapter 4 in Optimization Theory with Applications. Dover Publications, New York (1986).
Kersten, D., "Predictability and Redundancy of Natural Images, " J. Opt. Soc. Am. A., 4(12):2395–2400 (1987).
Field, D.J., "Relations between the Statistics of Natural Images and the Response Properties of cortical Cells, " J. Opt. Soc. Am. A., 4(12)2379–2394 (1987).
Snyder, D.L., et al., Random Point Processes in Time and Space. Second Edition. Springer–Verlag, New York, 215–236, 336–379 (1991).

Atick, J.J., "Could Information Theory Provide and Ecological Theory of Sensory Processing?", Network, 3:213–251(1992).
Van Hateren, J.H., "Real and Optimal Neural Images in Early Vision, " Nature, 360:68–70 (1992).
De Valois, R.L., et al., "A Multi–Stage Color Model, " Vision Research 33(8):1053–1065 (1993).
Eckert, M.P., et al., "Efficient Coding of Natural Time Varying Images in the Early Visual System, " Phil. Trans. R. Soc. Lond. B., 339:385–395 (1993).
Van Hateren, J. H., "Three Modes of Spationtemporal Pre-processing by Eyes, " J. Comp. Physio. A., 172:582–591 (1993).

(List continued on next page.)

*Primary Examiner*—Scott Rogers
*Attorney, Agent, or Firm*—Flehr Hohbach Test Albritton & Herbert LLP

[57] ABSTRACT

An apparatus and methods for efficiently processing signal and image data are described. The invention provides a representation of signal and image data that can be used as a figure of merit to compare and characterize different signal processing techniques. The representation can be used as an intermediate result that is may be subjected to further processing, and/or may be used as a control element for processing operations. As a provider of an intermediate result, the invention can be used as a step in processes for the transduction, storage, enhancement, refinement, feature extraction, compression, coding, transmission, or display of image, audio and other data. The invention improves manipulation of data from intrinsically unpredictable, or partially random sources. The result is a concise coding of the data in a form permitting robust and efficient data processing, a reduction in storage demands, and restoration of original data with minimal error and degradation. The invention provides a system of coding source data derived from the external environment, whether noise-free or contaminated by random components, and regardless of whether the data are represented in its natural state, such as photons, or have been pre-processed.

32 Claims, 15 Drawing Sheets

OTHER PUBLICATIONS

Van Hateren, "Spatial, Temporal and Spectral Pre–Processing for Colour Vision, " Proc. R. Soc. Lond. B., 251:61–68 (1993).

Laughlin, S.B., "Matching Coding, Circuits, Cells, and Molecules to Signals: General Principles of Retinal Design in the Fly's Eye, " Progress in Retinal and Eye Research, 13(1) 165–196 (1994).

Ruderman, D.L., "The Statistics of Natural Images, " Network: Computation in Neural Systems, 5:517–548 (1994).

Ruderman, D.L., "Designing Receptive Fields for Highest Fidelity, " Network: Computation in Neural Systems, 5:147–155 (1994).

Olhausen, B.A., "Sparse Coding of Natural Images Produces Localized, Oriented, Bandpass Receptive Fields, " Technical Report CCN–100–95. Dept. of Physiology, Cornell University (Nov. 9, 1995).

Olhausen, B.A., et al., Natural Image Statistics and Efficient Coding,: Proceedings of the Workshop on Information Theory and the Brain, University of Stirling, Scotland (Sep. 4–5, 1995).

Reike, F., et al., "Naturalistic Stimuli Increase the Rate and Efficiency of Information Transmission by Primary Auditory Afferents, " Proc. R. Soc. Lond. B., 262:259–265 (1995).

Moini, A., Vision Chips of Seeing Silicon, Third Revision. The Center for High Performance Integrated Technologies and Systems. The University of Adelaide, Australia (Mar 1997).

APPARATUS AND METHODS FOR IMAGE AND SIGNAL PROCESSING

RELATED APPLICATION

This application claims priority from applicants' co-pending U.S. provisional application entitled "Methods and Devices for Signal Processing with Attribution, Phase Estimation, Adaptation, and Quantization Capabilities", bearing provisional application number 60/054,399, filed Jul. 31, 1997, and incorporated herein by reference.

This invention was made with U.S. Government support under Grant No. EY 03785, awarded by the National Institutes of Health (U.S.P.H.S.). The U.S. Government may have certain rights to this invention.

BACKGROUND OF THE INVENTION

1. Field of the Invention

The present invention is generally related to the field of analog and digital signal processing, and more particularly, to apparatus and methods for the efficient representation and processing of signal or image data.

2. Description of the Prior Art

FIG. 1 is a block diagram of a typical prior art signal processing system 100. As shown in the figure, such systems typically include an input stage 102, a processing stage 104, an output stage 106, and data storage element(s) 108.

Input stage 102 may include elements such as sensors, transducers, receivers, or means of reading data from a storage element. The input stage provides data which are informative of man-made and/or naturally occurring phenomena. The informative component of the data may be masked or contaminated by the presence of an unwanted signal, which is usually characterized as noise. In some applications, an input element may be employed to provide additional control of the input or processing stages by a user, a feedback loop, or an external source.

The input data, in the form of a data stream, array, or packet, may be presented to the processing stage directly or through an intermediate storage element 108 in accordance with a predefined transfer protocol. Processing stage 104 may take the form of dedicated analog or digital devices, or programmable devices such as central processing units (CPUs), digital signal processors (DSPs), or field programmable gate arrays (FPGAs) to execute a desired set of data processing operations. Processing stage 104 may also include one or more CODECs (COder/DECcoders).

Output stage 106 produces a signal, display, or other response which is capable of affecting a user or external apparatus. Typically, an output device is employed to generate an indicator signal, a display, a hardcopy, a representation of processed data in storage, or to initiate transmission of data to a remote site, for example. It may also be employed to provide an intermediate signal for use in subsequent processing operations and/or as a control element in the control of processing operations.

When employed, storage element 108 may be either permanent, such as photographic film and read-only media, or volatile, such as dynamic random access memory (RAM). It is not uncommon for a single signal processing system to include several types of storage elements, with the elements having various relationships to the input, processing, and output stages. Examples of such storage elements include input buffers, output buffers, and processing caches.

The primary objective of signal or information processing system 100 is to process input data to produce an output which is meaningful for a specific application. In order to accomplish this goal, a variety of processing operations may be utilized, including noise reduction or cancellation, feature extraction, data categorization, event detection, editing, data selection, and data re-coding.

The design of a signal processing system is influenced by the intended use of the system and the expected characteristics of the source signal used as an input. In most cases, the performance efficiency required, which is affected by the available storage capacity and computational complexity of a particular application, will also be a significant design factor.

In some cases, the characteristics of the source signal can adversely impact the goal of efficient data processing. Except for applications in which the input data are naturally or deliberately constrained to have narrowly definable characteristics (such as a limited set of symbol values or a narrow bandwidth), intrinsic variability of the source data can be an obstacle to processing the data in a reliable and efficient manner without introducing errors arising from ad hoc engineering assumptions. In this regard, it is noted that many data sources which produce poorly constrained data are of importance to people, such as sound and visual images.

Conventional image processing methods suffer from a number of inefficiencies which are manifested in the form of slow data communication speeds, large storage requirements, and disturbing perceptual artifacts. These can be serious problems because of the variety of ways it is desired to use and manipulate image data, and because of the innate sensitivity people have for visual information.

Specifically, an "optimal" image or signal processing system would be characterized by, among other things, swift, efficient, reliable, and robust methods for performing a desired set of processing operations. Such operations include the transduction, storage, transmission, display, compression, editing, encryption, enhancement, sorting, categorization, feature detection and recognition, and aesthetic transformation of data, and integration of such processed data with other information sources. Equally important, in the case of an image processing system, the outputs should be capable of interacting with human vision as naturally as possible by avoiding the introduction of perceptual distractions and distortion.

That a signal processing method should be robust means that its speed, efficiency, and quality (for example), should not depend strongly on the specifics of any particular characteristics of the input data, i.e., it should perform "optimally," or near that level, for any plausible input.

This is an important aspect because a common inadequacy suffered by signal processing methods is their failure to be robust. JPEG-type methods in imaging, for example, perform better for "photographic" images having gentle gradations in color and luminance than for graphic images and others having sharp discontinuities. On the other hand, image compression methods such as those embodied in the GIF format perform best when an image has few of the complexities found in photographic images. Similar examples may be cited with regard to processing operations performed on audio and other classes of input data.

In part, conventional image processing methods lack robustness because there are an infinite number of possible images. Adding to this is the complication that in most situations, it is impossible to know beforehand exactly what features and complexities an image will possess. Thus, to describe an image entirely, one approach is to determine the luminance and color of every point in the image. However, the volume of information needed to accomplish this task can exceed several megabytes for a digital image of moderate size, making it burdensome to store, process, and transmit such information. Even then, the digital representation is an inexact record of the original image owing to the limitations inherent in constructing binary value based representations of continuous analog signals.

Information is lost in any discrete representation of continuous-valued data because discrete sampling over any finite duration or area cannot capture all of the variations in the source data. Similarly, information is lost in any quantization process when the full range of values in the source data cannot be represented by a set of discrete values.

In addition to difficulties imposed by the nature or implementation of a processing operation, other problems must be addressed when contaminating noise sources mask or distort the component of an input that is assumed to represent a signal of interest. However, it is rarely appreciated that there are other forms of randomness and unpredictability which cannot be defined legitimately as noise but which are nonetheless the source of problems with regard to the quality and robustness of signal processing methods. These forms of unpredictability may be considered in terms of intrinsic randomness and ensemble variability. Intrinsic randomness refers to randomness that is inseparable from the medium or source of data. The quantal randomness of photon capture is an example of intrinsic randomness.

Ensemble variability refers to any unpredictability in a class of data or information sources. Data representative of visual information has a very large degree of ensemble variability because visual information is practically unconstrained. Visual data may represent any temporal series, spatial pattern, or spatio-temporal sequence that can be formed by light. There is no way to define visual information more precisely. Data representative of audio information is another class of data having a large ensemble variability. Music, speech, animal calls, wind rustling through the leaves, and other sounds share no inherent characteristics other than being representative of pressure waves. The fact that people can only hear certain sounds and are more sensitive to certain frequencies than to others is a characteristic of human audio processing rather than the nature of sound. Examples of similarly variable classes of data and information sources can be found throughout nature and for man-made phenomena.

The unpredictability resulting from noise, intrinsic randomness, and ensemble variability, individually and in combinations, makes it difficult and usually impossible to extract the informative or signal component from input data. Any attempt to do so requires that a signal and noise model be implicitly or explicitly defined. However, no signal and noise model can be employed which is able to assign with absolute confidence a component of input data to the category of informative signal as opposed to uninformative noise when there is any possibility that the noise, intrinsic randomness, or ensemble variability share characteristics.

A signal and noise model is implicitly or explicitly built into a signal processing operation in order to limit the variability in its output and to make the processing operation tractable. Signal processors generally impose some form of constraint or structure on the manner in which the data is represented or interpreted. As a result, such methods introduce systematic errors which can impact the quality of the output, the confidence with which the output may be regarded, and the type of subsequent processing tasks that can reliably be performed on the data.

An often unstated but significant assumption employed in signal processing methods is that source data can be represented or approximated by a combination of symbols or functions. In doing so, such processing methods essentially impose criteria by which values and correlations in an input are defined or judged to be significant. A signal processing method must embody some concept of what is to be regarded as signal. However, the implicit or explicit presumption that a certain set of values or certain kinds of correlation can be use to provide a complete definition of a signal is often unfounded and leads to processing errors and inefficiencies. By defining a signal in terms of a set of values or correlations, a processing method is effectively assigning all other values and correlations to the category of noise. Such an approach is valid only when it is known that: 1) the information source that the input data represents takes on only a certain set of values or correlations; and 2) noise or randomness in the input data never cause the input to take on those values or correlations by chance. Conditions of this sort are rare at best and arguably never occur in real life. These conditions are certainly not true for visual, audio, or other information sources which have an unconstrained ensemble variability. For such classes of data, a finite set of values or correlations is insufficient to completely cover the range of variability that exists. As a result, some values or correlations which are representative of an information source will be inevitable and erroneously assigned to the category of noise. It should be noted that the inventive method herein does not presume such a set of specific values or correlations.

To further illustrate some of the limitation of signal and noise models in general, we discuss in this section several processing techniques which are found in the field of image processing. Among conventional image and signal processing techniques are histogram methods, predictive coding methods, error coding methods, and methods which represent data in terms of a set of basis functions such as JPEG, MPEG, and wavelet-based techniques.

Histogram methods are based on categorizing the luminance and color values in an image, and include the concept of palettes. A histogram is related to a probability density function which describes how frequently particular values fall within specified range limits. Histogram methods are used to quantize source data in order to reduce the number of alternative values needed to provide a representation of the data. In one form or another, a histogram method has been applied to every digital image that has been derived from continuous-valued source data. Histogram methods are also used for aesthetic effect in applications such as histogram equalization, color re-mapping, and thresholding.

However, a disadvantage of histogram techniques is that the processing scheme used to implement such methods must determine which ranges of value and color are more important or beneficial than others. This conflicts with the fact that the distribution of values in an image varies dramatically from one image to the next. Similarly, the number and location of peaks and valleys in a histogram varies significantly between images. As a result, histogram methods are computationally complicated and produce results of varying degrees of quality for different kinds of images. They also tend to produce an output having noticeable pixelation and unnatural color structure.

Predictive coding methods attempt to compensate for some of the limitations of histogram methods by considering the relationship between the image values at multiple image points in addition to the overall distribution of values. Predictive coding techniques are suited to data having naturally limited variability, such as bi-tonal images. Such methods are an important part of the JBIG and Group ¾ standards used for facsimile communications. However, for more complicated image data such as multi-level grayscale and full color images, predictive coding methods have not been as effective.

Predictive coding techniques are based on the hypothesis that there are correlations in image data which can be used to predict the value of an image at a particular point based on the values at other points in the image. Such methods may be used to cancel noise by ignoring variations in an image that deviate too significantly from a predicted value. Such methods may also be used in image compression schemes by coding an image point only when it deviates significantly from the value predicted.

However, one of the problems encountered in predictive coding is the difficulty in deciding that a particular deviation in an image is an important piece of information rather than noise. Another source of difficulty is that correlations in an image differ from place to place as well as between images. At present, no conventional predictive coding method has employed a sufficiently robust algorithm to minimize processing errors over a realistic range of images. As a result, conventional predictive coding methods tend to homogenize variations between images.

Error coding methods extend predictive methods by coding the error between a predicted value and the actual value. Conventional error coding methods tend to produce a representation of the input data in which small values near zero are more common than larger values. However, such methods typically do not reduce the total dynamic range from that of the input data and may even increase the range. As a result, error coding methods are susceptible to noise and quantization errors, particularly when attempting to reconstruct the original source data from the error-coded representation. In addition, since error coding is an extension of predictive coding, these two classes of methods share many of the same problems and disadvantages.

Representation of data using a set of basis functions is well known, with Fourier techniques being perhaps the most familiar. Other transform methods include the fast Fourier transform (FFT), the discrete cosine transform (DCT), and a variety of wavelet transforms. The rationalization for such transform methods is that the basis functions can be encoded by coefficient values and that certain coefficients may be treated as more significant than others based on the information content of the original source data. In doing so, they effectively regard certain coefficient values and correlations of the sort mimicked by the basis functions as more important than any other values or correlations. In essence, transform methods are a means of categorizing the correlations in an image. The limitations of such methods are a result of the unpredictability of the correlations. The variations in luminance and color that characterize an image are often localized and change across the face of the image. As a result, FFT and DCT based methods, such as JPEG, often first segment an image into a number of blocks so that the analysis of correlations can be restricted to a small area of the image. A consequence of this approach is that bothersome discontinuities can occur at the edges of the blocks.

Wavelet-based methods avoid this "blocking effect" somewhat by using basis functions that are more localized than sine and cosine functions. However, a problem with wavelet-based methods is that they assume that a particular function is appropriate for an image and that the entire image may be described by the superposition of scaled versions of that function centered at different places within the image. Given the complexity of image data, such a presumption is often unjustified. Consequently, wavelet based methods tend to produce textural blurring and noticeable changes in processing and coding quality within and between images.

To address some of the problems arising from the complexity of images as an information source, a number of attempts have been made to incorporate models of human perception into data processing methods. These are based on the belief that by using human visual capabilities as a guide, many of the errors and distortions introduced during processing can be rendered inconsequential. In essence, use of human perceptual models provides a basis for deciding that some visual information is more important than other information. For example, television and several computer image formats explicitly treat luminance information as more important than color information and preferentially devote coding and processing resources to grayscale data. While this approach shows promise, there is no sufficiently accurate model of human perception currently available to assist in processing image data. As a result, attempts to design processes incorporating such models have resulted in images that are noticeably imperfect.

What is desired and needed are apparatus and methods for the processing of general signal and image data which are more efficient than conventional approaches. In particular, signal and image processing apparatus and methods are desired which are less computationally complex and have reduced data storage requirements compared to conventional methods. Apparatus and methods for reconstructing signals and images from processed data without the degradation of signal or image quality found in conventional approaches are also desired.

The present invention provides such apparatus and methods.

SUMMARY OF THE INVENTION

The present invention is directed to apparatus and methods for efficiently processing signal and image data. The inventive method provides a representation of signal and image data which can be used as an end product or as an intermediate result which is subjected to further processing. As an end product, the data representation provides a figure of merit that can be used to compare and characterize different signal processing techniques, or as a control element for causing adaptation of a processing operation. As a provider of an intermediate result, the method can be used as a step in processes for the transduction, storage, enhancement, refinement, feature extraction, compression, coding, transmission, or display of image data. In this context, the inventive method significantly reduces the computational and data storage requirements of conventional signal processing methods. The invention provides improved methods of manipulating data from intrinsically unpredictable, or partially random sources to produce a concise coding of the data in a form that allows for more robust and efficient subsequent processing methods than is currently possible, a reduction in storage demands, and restoration of the original data with minimal error and degradation. The invention provides a system of coding source data derived from the external environment, whether noise-free or contaminated by random components, and regardless of whether the data is represented in its natural state, such as photons, or has been pre-processed.

Other features and advantages of the invention will appear from the following description in which the preferred

DETAILED DESCRIPTION OF THE INVENTION

Figure 1:
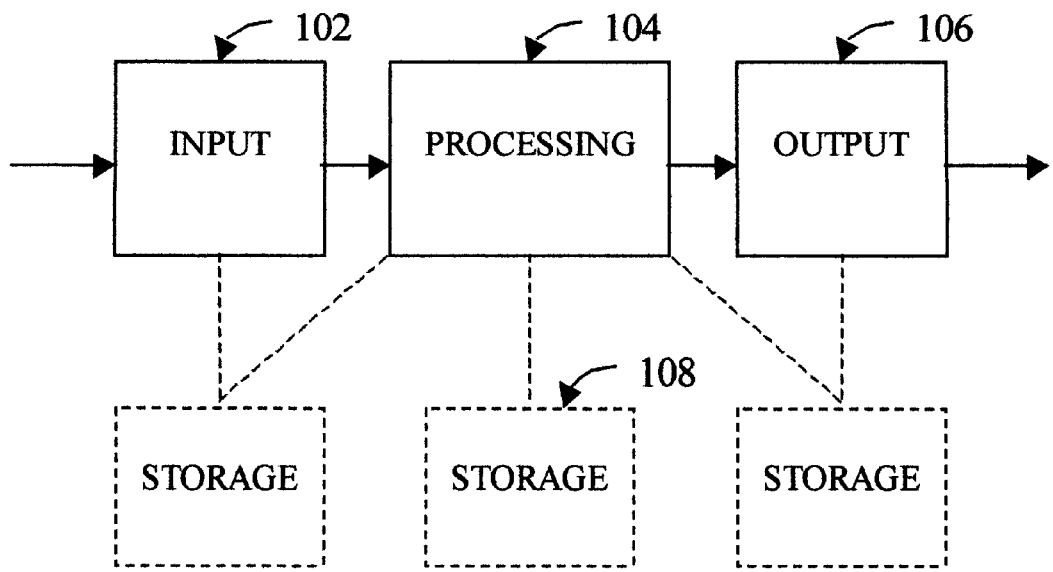
FIG. 1 is a block diagram of a typical prior art signal processing system.

The present invention provides a signal processing method and apparatus implementing such method, which method and apparatus are advantageously applicable to any type of data represented in a format suitable for application of the disclosed processing operations. Without limitation, the data can include both digital data and analog data, and data representative of visual images, audio signals, and radar signals. While portions of the following description refer to or may be directed to visual image data processing, it is important to appreciate that the present invention is not limited to use with such data, and that reference to such data is for purposes of example only. Similarly, it is noted that the mathematical description of the inventive method uses the form of a generalized frequency notation. The generalized frequency may be read as a temporal, spatial, or spatio-temporal frequency, and is utilized because the fundamental processing methodology does not differ for time, space, or space-time. Temporal processing simply requires that the conditions of causality be satisfied. The use of frequency domain notation should not be taken to mean that data need conversion into the frequency domain for processing; rather, the frequency domain terms should be thought of symbolically. It is often preferable to process the data as it arrives in time and space using circuits, for example, of the type described in the copending provisional application. This is one of the advantages of the inventive method, which performs what might be burdensome computations in other processing methods simply and quickly by using such circuits.

Applicants have come to recognize that the commonly made assumption in the prior art that some kinds of information or correlations are more important than others is the source of many of the problems which arise in the processing of complicated data sources. This assumption is manifested both in the choice of which signal processing method(s) to apply to the data and is also the basis for the operations performed by most conventional signal processing schemes. For example, histogram methods essentially categorize value ranges in terms of visual importance for specific images. In one way or another, predictive coding, error coding, and basis function methods implicitly or explicitly assume that certain kinds of variations in image data are more significant than others. Such methods are based on ad hoc engineering assumptions even if in some cases they are partly supported by a theoretical or empirical model such as a model of human perception. As a result, such methods are a source of procedural bias in the data processing because they introduce systematic errors that arise from the processing method, rather than being a result of the inherent characteristics of the source data.

The introduction of such systematic errors may be thought of as the introduction of systematic misinformation. Thus, most conventional processing methods impose specific constraints on the data that result in inefficient and sometimes erroneous interpretations and manipulations of the data.

That some conventional processing methods possess inadequacies or inefficiencies does not mean they are without merit for particular applications. However, the presumptions implicit in such methods restrict their versatility and also limit the processing operations which can be performed on the data while maintaining a desired degree of confidence in the result. For example, it is probably inappropriate to perform a fingerprint recognition operation on a blocky JPEG image as errors introduced by the DCT quantization result in reduced efficiency and can lead to misidentification. Similar arguments can be made about other methods that presume that some information is more important than other information, or that certain characteristics of a set of data determine whether it should be assigned to signal or to noise. Once such a method is applied to source data, the range of valid operations that can be subsequently performed becomes limited.

One advantage of the inventive method is that discrete sampling methods can be employed in such a manner as to minimize information loss. Moreover, the inventive method provides ways in which continuous-valued representations of source data can be generated from a discrete representation.

A significant feature of the inventive method is that it creates, from input data and an implicit or explicit signal and noise model, a metric of confidence that has characteristics superior to those of a conventional representation of a signal: it may be used in place of a signal representation in many signal processing operations; it may be used to control the quality and efficiency of processing operations; and it may be used to characterize existing or hypothetical processing operations. Consequently, the inventive method can be used to control and quantify the errors that may be introduced by the imposition of a signal and noise model.

The signal and noise concept is so ingrained that it is unquestioned and its limits unexplored. In arriving at the present invention, applicants have had to reconsider the signal and noise concept, which they have come to realize is not incorrect but rather incomplete. The assignment of aspect of input data to either signal or noise is generally attended by uncertainty as to the confidence that should be placed on such an assignment. The inventors have realized that such uncertainty can be represented in a manner that stands apart from the representation of a signal and a representation of a noise. That uncertainty signal represents the power in the input that cannot be attributed to either signal or noise alone; i.e., it serves as a metric of confidence. Applicants have also come to realize that the uncertainty signal represents the information source that gave rise to the input data in a compact manner that may be used both in place of a representation of a signal and as a control signal for controlling information processing operations.

In considering the shortcomings of conventional signal and information processing methods (such as those described above), applicants realized that a reliable and efficient signal processing method should have certain characteristics. These include, but are not limited to:

(1) the method should embody a minimum of ad hoc assumptions and sources of procedurally introduced bias to minimize systematic errors and maximize versatility;

(2) the method should be computationally simple and efficient;

(3) the method should be reliable and robustly applicable to complex data sources;

(4) the method should provide a means of minimizing noise and randomness in source data without requiring detailed knowledge of which data components are informative and which are contamination;

(5) the method should introduce a minimum amount of distortion;

(6) the method should allow for input data to be quantized and sorted with minimal signal deterioration;

(7) the method should allow for a high degree of data compression;

(8) the method should allow processed data to be efficiently transmitted to remote locations;

(9) the method should be able to adapt to changes in the source data to reduce processing errors and inefficiencies; and

(10) the method should be able to be implemented using either analog and/or digital techniques as is appropriate for a particular application.

In considering these requirements, applicants questioned the traditional concept that some information can be classified as more important than other information. With regards to image processing, applicants reconsidered the assumption that the luminance and color values in an image should be considered the raw information. Applicants realized that luminance and color do not provide the most efficient, robust and reliable information about an image which can be processed to extract desired information about the data. This realization and its extension to other types of information sources and data types has resulted in a number of concepts that help form the basis of the present invention.

The Ambiguous Component of the Input Data

Every signal and information processing method strives to produce some result from a set of inputs. The input may be, and commonly is, described as having two components: a signal component that contains the information or message, and a noise component that reflects distortions of the signal component and contamination in the form of random variations (random noise) and crosstalk, for example. The present invention recognizes that the initial step of defining an input as having a signal component and a noise component has vast implications because it imposes a particular model on the data. It essentially requires that all of the data be categorized as either signal or noise, with the associated ramifications regarding presumed magnitude and phase relationship(s) between a set of signal data and other signal data, signal data and noise data, and a set of noise data and other noise data. The bias of the model choice introduces limitations on the precision with which the data can be processed while maintaining a "bright line" which differentiates signal from noise.

Given a signal and noise model, the input may be written as $X(v)$, the signal as $S(v)$, and the noise as $N(v)$, where the capital letters designate a frequency domain representation (e.g., the Fourier transform) and the parameter $v$ represents a generalized frequency (typically a temporal, spatial, or spatio-temporal frequency). In such a situation, the input, as the sum of signal and noise, may be written as:

$$X(v)=S(v)+N(v).$$

In using such a data model, the input data $X(v)$ is known, and a model for the noise contribution $N(v)$ is assumed. Based on these terms, a representation of the signal $S(v)$ is determined.

However, despite the wide-spread convention of representing data in terms of signal and noise components, applicants realized that there is a more efficient and versatile way of processing input data, particularly data arising from complicated sources. One motivation for the present invention is that the assumption that input data can be decomposed into signal and noise components is incongruous with the reality of complicated information sources, as one can rarely, if ever, precisely define the signal components of a data set from a priori knowledge. Attempts to impose a definition of signal in a particular processing scheme implicitly defines the noise, introduces systematic error, and restricts the type of processing operations which can reliably be performed on the data. For example, the conventional image processing methods described above presume that some aspect(s) or characteristics of the input data are more significant than others, e.g., value ranges or types of correlations. These methods inherently define the signal component and thus can result in the kind of processing limitations described.

Thus, the present invention realizes that the "decision," implicitly or explicitly, as to what is signal and what is noise has introduced inefficiencies into conventional signal processing schemes and rendered them sub-optimal. Instead, what is desired is a method of "interpretation" which does not introduce these disadvantages. Thus, using this approach, the present invention provides apparatus and methods of representing input data from complex sources in terms of measures of ambiguity and uncertainty, instead of in terms of signal and noise. These methods, and this kind of data representation, have several advantages over the traditional signal and noise approach.

The concept of interpretation is in some ways similar to that of estimation. Estimation theory is a starting point, but this should not be construed as a limitation on the scope of the present invention. For example, the explicit use of noise terms in the following development is included for generality and should not be taken to mean that the present invention is limited to noisy data sources. In the classic signal estimation problem, the goal is to produce the best possible estimate of a signal component from an input. Representing the estimated signal as S'(v), the operation may be represented generically as: X(v)−S'(v). Producing an estimate of the signal also produces an estimate of the noise component:

$$N'(v)=X(v)-S'(v).$$

However, just what processing operation should be performed to produce the estimate depends on how one defines "best" and what constraints are imposed on the characteristics of signal and noise.

The problem is that when there is a possibility that signal and noise components of the input data could be confused, or when a precisely accurate definition of the signal or noise is not possible (as is the case for many complex information sources, such as visual images), there is a possibility that the estimation process will misinterpret or ignore some portion of the informative content of the input data. This means that there will be some ambiguity.

This possible "misinterpretation" arises because some correlations in the input data could be attributed either to the signal or to the noise component, instead of confidently assigned to one or the other. Indeed, any signal estimation process, linear or not, may be described as one in which correlations in the input are weighted according to how likely it is that those correlations are informative of the message rather than of contamination, given some prior expectations or definitions concerning the signal and noise and some weighting criterion.

This potential ambiguity may be understood in terms of correlations between the supposed signal and noise components. Correlations are often discussed in terms of amplitude and phase correlations. The input data may be written as:

$$X(v)=|X(v)|\exp(i\theta_X(v)),$$

where $|X(v)|$ is the amplitude spectrum and $\theta_X(v)$ is the phase spectrum of that data. Similarly:

$$S'(v)=|S'(v)|\exp(i\theta_{S'}(v)) \text{ and } N'(v)=|N'(v)|\exp(i\theta_{N'}(v)).$$

Note that this formulation does not presume a linear relationship between the input data and the estimates, and is a valid mathematical statement independent of the processing method. Using the above notation, the power associated with correlations in the input data may be represented by:

$$|X(v)|^2=|S'(v)|^2+2|S'(v)||N'(v)|\cos(\theta_{S'}(v)-\theta_{N'}(v))+|N'(v)+|N'(v)|^2.$$

The squared amplitude spectra may be read as power spectra. The equation illustrates that the input power may be represented as the sum of the power in the estimated signal plus the power in the estimated noise, plus a cross term (the middle term) which represents the remaining power. This remaining power is the power in the input that cannot be accounted for by the estimated signal and noise viewed independently of each other. In one sense it represents the power that cannot be attributed to either the signal alone or the noise alone with sufficient confidence, based on the signal and noise model adopted. It is the ambiguous power due to correlations between the signal and noise estimates, and is thus a measure of the limitations or imprecision of the model used to assign the input data to either signal or noise.

As used herein, the aspects of the input data that cannot be ascribed with sufficient confidence to signal alone or to noise alone is termed the "ambiguous" component of the input. Note that, in the conventional signal and noise paradigm, the ambiguous component is not a separate entity, i.e., the input data is fully described by the signal and noise estimates, X(v)=S'(v)+N'(v). The ambiguous component preferentially represents the correlations in the input that are least predictable. The ambiguous component has largely been ignored in conventional signal and information processing because it is believed to represent the aspects of source data that are too uncertain to be a reliable source of information. Based on a recognition of the significance of the ambiguous component of input data, the present invention recognizes that representing or extracting this component by performing an operation on the input data, many of the problems associated with other signal processing methods could be avoided and/or controlled.

Thus, the present invention recognizes that application of a signal and noise model to the processing of input data introduces a source of error in the processing because it requires that each piece of data be assigned to either signal or noise. However, there is some input data power that is not assigned to either signal or noise, i.e., the ambiguous component. In conventional processing schemes, this input data power is ignored, with the result that some information contained in the input data is lost. However, the present invention provides a method for extracting this previously lost information and utilizing it to improve processing of the data.

In determining an operation to perform on input data to extract the ambiguous component, applicants were guided by the previously identified criteria for reliable and efficient processing. By implementing a method based on a minimum number of assumptions and which minimizes data distortions, the present invention can satisfy many, if not all, of the criteria. Further, the present invention recognizes that imposing a minimum of assumptions as to the nature of the data has a direct bearing on how distortions could be minimized.

Estimation of the Ambiguous Component

To introduce the minimum number of assumptions regarding the form or nature of the input data, it is instructive to return to the idea that some correlations in input data may be more important than others and that one can rely on such a characterization before the data is processed. In image data, for example, query whether the edges should be treated as more significant than smooth gradations. It is arguable that edges are perceptually a more significant feature, however, to incorporate the concept of an edge in a processing method, it is necessary to define the characteristics of an edge. This is a more difficult task than might be suspected. What most would agree to be an edge in an image is typically a gradation of intensity or color over a narrow region rather than an abrupt transition. It is, of course, possible to define an edge as a feature that changes by a certain amount within a certain area, but this ignores the fact that the gradation could take the form of a step or a ramp or other transition function. In addition, one must also be aware that an edge is not always the most perceptually significant feature. For example, whereas an edge might be important in an image of buildings, it may not be in an image of a landscape at sunset. In order to assure optimal processing versatility it is desirable to adopt a measure of importance that is valid not only within an image but also between images of different kinds.

Transitions and variations in source data are partly definable by phase correlations. Phase is not an absolute metric because it refers to the relationship between different parts of the data. In images, for example, phase information indicates how certain features or transitions are located with respect to others. Thus, to define a set of correlations as more important than others would require a reference point; e.g., where a camera was pointed or the time when data were acquired. However, for complicated data sources, there is no way to define reference points so that the input data are likely to have particular phase characteristics, particularly if the input data contain random disturbances. Multiple exposures of a piece of film, for example, will tend to produce a gray blur because there is no likelihood that certain image features will line up in a particular way with respect to the camera.

Thus, to minimize the number of assumptions and maximize versatility, the present invention recognizes the desirability of processing different kinds of phase correlations in a similar manner. An advantage of this approach is that specialized processing operations which embody assumptions about the importance of different kinds of phase correlations can be performed subsequently without constraining the types of other possible processing operations.

Processing methods that have a minimal impact on the phase characteristics of a set of input data are linear. The only phase distortions necessarily introduced by such methods are those that arise from the fact that processing can only be performed on data that has already been acquired. Linear processes that introduce the minimal amount of phase distortion allowed by the principle of causality are termed "minimum-phase processes". Further information regarding minimum-phase processes may be found in the reference Kuo, F. F. (1966) *Network Analysis and Synthesis*. 2nd. Ed. Wiley & Sons: New York.

In the purely spatial case, as for still images, where time is not a factor, the inventive processing method will introduce zero phase distortion. In temporal and spatio-temporal cases in which an output is desired in real time, the inventive processing method will meet at least the criteria for minimum-phase processes as the characteristics of such processes are understood by those of skill in the art of signal processing. In cases in which data are stored before processing, a delay equivalent to a phase distortion is introduced and the phase characteristics of the inventive method need not be constrained. Note that the technique of Wiener-Hopf spectrum factorization may also be used to define the phase characteristics of the inventive method to satisfy the causality constraint. Further details regarding Weiner-Hopf spectrum factorization may be found in the reference Pierre, D. A. (1986) *Optimization Theory with Applications*. Dover: New York.

Note that the conclusion that a desirable processing operation should be linear is independent of whether it is desired to estimate the signal and noise components from input data or represent the ambiguity. Thus, in the linear signal estimation problem, the estimated signal may be written as:

$$S'(v)=W(v)X(v),$$

where $W(v)$ represents a processing operation having an amplitude spectrum $|W(v)|$ and a phase spectrum $\theta_W(v)$. Similarly, $$|S'(v)|=|W(v)||X(v)| \text{ and } \theta_{S'}(v)=\theta_W(v)+\theta_X(v),$$

Recognizing that any phase distortion introduced in-processing intrinsically has nothing to do with the signal processing problem, one can imagine a non-causal, zero-phase operation, $X'(v)$, which would produce the result:

$$S'(v)=|W(v)|X'(v),$$

where $X'(v)=X(v)\exp(i\theta_W(v))$.

Consequently, the effective noise estimate would be:

$$N'(v)=(1-|W(v)|)X'(v)).$$

The magnitude of the ambiguous power component may therefore be written as:

$$2|S'(v)||N'(v)|=2|W(v)|(1-|W(v)|)|X'(v)|^2,$$

Note that $|X'(v)|^2=|X(v)|^2$.

Despite the fact that in some sense any processing operation may be considered a signal estimation process, it is more common to think of a processing operation as something that performs a task on a signal or signal estimate that is produced by a sub- or pre-processor. The distinction between the notions of signal estimation and task arises from the conventional view of signal and noise.

Figure 2A:
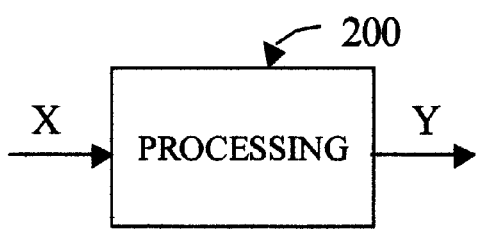
FIG. 2 is a block diagram showing the processing of a set of input data into an output according to the method of the present invention, with the processing operation(s) represented as a two-stage operation.
Figure 2B:
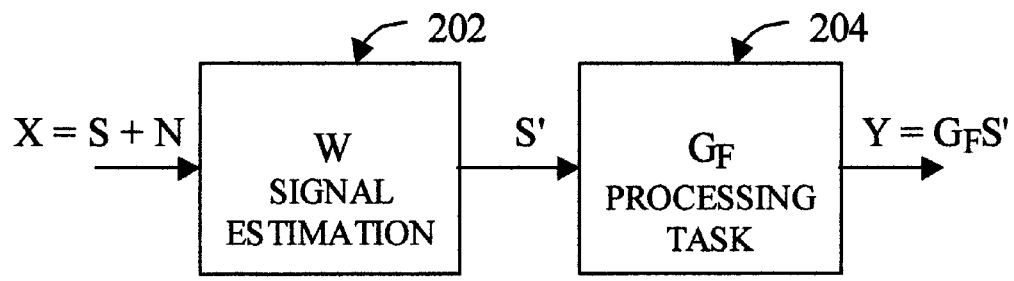

FIG. 2 is a block diagram showing the processing of a set of input data, X, into an output, Y according to the present invention, with the processing operation(s) represented as a two-stage operation, in this case a combination of a signal estimation operation and a processing task. FIG. 2*a* shows the input $X(v)$ being processed by a set of processing operations represented by box 200 to produce an output, $Y(v)$. As shown in FIG. 2*b*, the processing operations of box 200 may be represented as a combination of a signal estimation process W (box 202), which operates on $X(v)=S(v)+N(v)$ to produce a signal estimate, $S'(v)$, followed by a processing task, $G_f$, which operates on the signal estimate to produce the output $Y(v)=G_fS'$.

The estimation stage (box 202) may be characterized as a universal pre-processor. For example, data which are input to an array of separate processors performing signal processing operations may be represented in terms of a single, shared signal estimation process and an array of processing tasks subserving the various operations.

Note that in many cases, what might be regarded as input data may also be regarded as a signal estimate in the sense of a signal and information processing operation. For example, a digital representation of a photograph might be considered an estimate of the actual luminance and spectral components of the real world. It is not intended to limit the scope of the invention to cases in which input data may be considered noisy in the conventional sense. The term signal estimate refers to any data which may be regarded to be representative of an informative source.

One goal of the present invention is to produce a representation of the ambiguous component of the input data in a manner that is robust in the sense of being applicable to any possible input. By inspecting the preceding equation for the power of the ambiguous component, and recognizing that $|X'(v)|^2=|X(v)|^2$, the present inventors recognized that the linear operation:

$$D'(v)=U(v)X(v),$$

where $U(v)$ is a zero-phase or minimum-phase process having an amplitude spectrum given by:

$$|U(v)| = \sqrt{|W(v)|(1-|W(v)|)}$$

would accomplish that goal. The variable D'(v) denotes a result obtained from the input data that indicates the ambiguity in the input data given the implicit signal and noise model embodied in the processing operation W(v). As used herein, U(v) and D'(v) are termed the uncertainty process and signal, respectively. Note that W(v) satisfies the relation |W(v)|<1. If required, processing function W(v) should be scaled or normalized to satisfy this relationship. Note that the power of the uncertainty signal is one-half the ambiguous component of power. The factor of one-half was chosen so one could imagine that the ambiguous component of power is split evenly between uncertainty associated with a signal estimate and uncertainty associated with a noise estimate. Note that this choice of scaling should not be taken so as to limit the inventive method. The uncertainty process is constrained only by its frequency dependence.

As for any processing operation, the uncertainty process may be represented as a combination of a signal estimation stage and a processing task as noted. Thus U(v) may be represented as:

$$U(v) = W(v) \, G_U(v)$$

so that:

$$D'(v) = U(v)X(v) = G_U(v)W(v)X(v) = G_U(v) \, S'(v)$$

As used herein, $G_u$ is termed the uncertainty task, and the process it represents has an amplitude spectrum characterized by:

$$|G_U(v)| = \sqrt{(1-|W(v)|)/|W(v)|}$$

To maximize versatility of the uncertainty task, it may have zero- or minimum-phase characteristics, although other phase characteristics may be appropriate as noted.

The uncertainty signal, D'(v), provides a concise indication of the quality or reliability associated with an implicit or explicit imposition of a signal and noise model by a processing operation. Its point-to-point value provides an estimate of the probable error associated with the signal and noise measures. Its root-mean-square value (or any equivalent), judged against that of the input data, provides a measure of overall reliability of the estimation process. The uncertainty signal is a stand-alone linear transformation of the input data. It may be produced from the representation of a signal or noise, but can also be produced directly from input data without having to produce signal and noise estimates. In many cases of interest, including the visual case, the signal and noise estimates, if desired, may be produced via a linear transformation of the uncertainty signal instead of the original input data. Thus, the uncertainty signal can be used as a substitute for the signal estimate as the primary representation of the input data. An advantage to this representation is that the input data will tend to be represented with less power and a narrower dynamic range. This aspect of the uncertainty signal is advantageous for data compression applications.

Figure 3A:
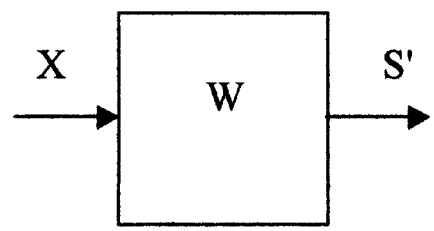
FIG. 3 is a block diagram showing the relationships between the input data set, processing function, uncertainty operator, uncertainty signal, and the signal estimate, in accordance with the present invention.
Figure 3B:
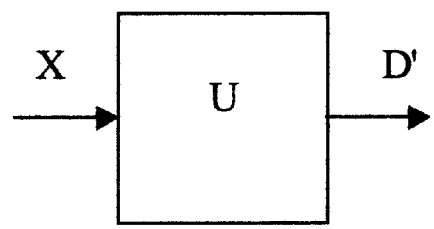
Figure 3C:
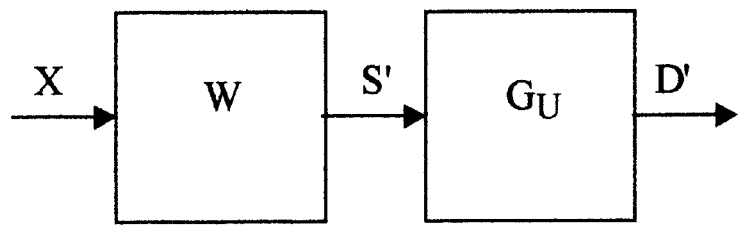

FIG. 3 is a block diagram showing the relationships between the input data set X, the processing function W, the uncertainty operator U, uncertainty signal D', and the signal estimate S', in accordance with the present invention. As shown in FIG. 3a, the input signal X(v) is operated on by the processing function W(v) to form the signal estimate S'(v). The input data may also be operated on by the uncertainty operator U(v) to produce the uncertainty signal D'(v), as shown in FIG. 3b. This process may also be represented as a combination of the processing function W(v) and an uncertainty processing task, $G_u$, as shown in FIG. 3c. This two-stage approach has the advantage that both the signal estimate and uncertainty signal are made available for subsequent processing operations. Note that the uncertainty signal may be obtained by operating on the output of an estimation process, or on a representation of a signal.

The uncertainty signal may also be used as an indicator of the quality of a processing operation, although the uncertainty process and the uncertainty signal are even more versatile. The uncertainty process tends to preferentially report those aspects of an input which are most unique and unexpectable; i.e., in terms of what is least predictable and most uncertain with regard to an implicit or explicit signal and noise model. The uncertainty signal tends to have a more compact and predictable dynamic range than typical signal data, and contains the same information content as a signal estimate. It provides a measure of the root-mean-square error that can be expected in an estimation process or signal representation. It also provides a characterization of the phase properties of input data and/or a signal estimate without the need for additional processing.

Typically, in designing a signal processing method, tasks such as feature emphasis or de-emphasis, compression, process monitoring, feature detection or extraction, phase extraction, dynamic range optimization, transmission and reception, and a variety of control processes are treated as separate processes, with each performing specific and unique operations on input data. However, the characteristics of the uncertainty signal demonstrate how the inventive uncertainty process acts to unify and simplify such processing tasks.

Because it contains the same informative value as a signal representation, many processing operations that might have been performed on a signal representation may instead be performed on the uncertainty representation with either zero or minimal loss of informative value. Advantageously, in many cases the uncertainty signal typically has a smaller root-mean-square value and narrower effective dynamic range than the signal representation. Also, because it emphasizes the unique and uncertain aspects of data, fewer resources need be directed to processing the commonplace or expectable components.

For example, chromatic information in a color image may be subsampled to a greater extent without significantly noticeable degradation when it is first represented in terms of uncertainty, as opposed to the conventional representation as a linear combination of red, green, and blue intensity values. In addition, the inventive method of representing uncertainty does not require specific ad hoc assumptions about the characteristics of the input data. Thus, processing operations based on the uncertainty signal will tend not to introduce errors resulting from inappropriate presumptions. The fact that the uncertainty signal has a compact, predictable dynamic range and distribution of values means that it may be quantized more efficiently than is typically possible for signal estimates or representations. Indeed, the quantization method described herein provides a means of representing the informative content of a signal estimate in terms of the quantized uncertainty signal with minimal error and relatively few quantization levels compared to typical histogram methods.

Because the uncertainty signal tends to preferentially represent features that are implicitly unexpectable, it can be used to emphasize or de-emphasize features using simple arithmetic techniques without a need to decide before hand which features may or may not be important. The same characteristic allows features to be extracted from data, or the uncertainty signal itself, using simple threshold comparison techniques. For example, edges, contrast discontinuities, and more complicated features such as the eyes of a face can be extracted from image data without having to define what constitutes an edge or eye by applying a threshold comparison process to an image's uncertainty signal. Alone and in combination, the inventive techniques allow data to be categorized, identified, manipulated, compressed, coded, transmitted, and processed to achieve typical signal and information process goals in simpler ways than conventional methods and with minimal error or information loss. In addition, these techniques provide for new ways to control and monitor processing operations.

Figure 4:
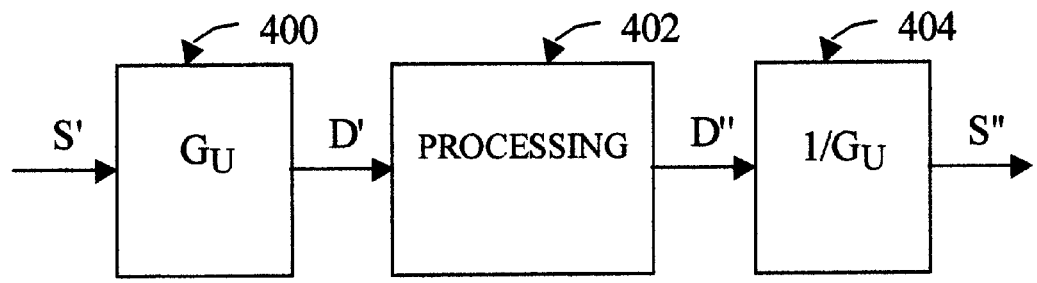
FIG. 4 is a block diagram showing a signal estimate operated on by an uncertainty task or bias to generate the uncertainty signal, subjected to further processing steps, and then operated on by the inverse of the task to obtain a new estimate of the signal.

FIG. 4 is a block diagram showing a signal representation S' operated on by an uncertainty task or bias $G_u$, (box 400) to generate the uncertainty signal D' according to the inventive signal processing method, subjected to further processing steps (box 402), and then operated on by the inverse of the task $G_u$ (box 404) to obtain a new estimate of the signal, S"(v). As shown in the figure, the uncertainty signal D' is subjected to further processing steps to obtain a processed uncertainty signal, D"(v). This result is then operated on by the inverse of the task $G_u$ (represented as $1/G_u$) to obtain a new signal representation, S"(v).

Processing operations suitable for implementation in box 402 include, for example and without limitation: quantization, de-quantization, subsampling and other means of resolution reduction, including any form of dithering; upsampling and other means of increasing apparent resolution including interpolation; DCT, FFT, and similar operations in which data are transformed to or from a frequency domain representation; wavelet-based and other convolution processes; fractal-type methods; coding and decoding methods including PCM, run-length methods, Huffman coding, arithmetic coding, Lempel-Ziv-type methods, and Q-coding; and any combination of such operations or methods. Suitable processing operations also include: permanent and/or temporary data storage; retrieval from stored sources; transmission; and reception.

The advantages in using an uncertainty signal in place of a signal representation in processing operations are related to the uncertainty signal's lower power, more compact and predictable distribution of values, and tendency to preferentially represent the implicitly unexpectable aspects of data. For example, in image processing applications, for a given root-mean-squared difference between S' and S", the uncertainty signal can be quantized more coarsely and subsampled to a greater extent than S'. Similarly, in sampling processes, the amplitude of the uncertainty signal can be used to modulate the sampling rate or density in a linear, exponential, logarithmic, titration-like, or similar manner. The amplitudes and correlations in the uncertainty signal may also be used as a guide for the positioning of basis functions. In addition, the absolute value, for example, of the uncertainty signal, rather than, or in conjunction with, the coefficient values of basis functions, may be used to control the number and/or values of basis-function coefficients that will be preserved in a compression process. Coding methods can be better tuned to data like the uncertainty signal which has a predictable distribution of values. In addition, the amount of power needed to transmit the uncertainty signal is less than would be needed to transmit S'.

Note that the present invention provides a signal processing method that is not limited to linear operations having particular phase characteristics employed to estimate signal and/or noise from input data. By making the minimum number of assumptions regarding the attributes of the input data, applicants have been able to investigate how conventional processing operations impose a signal and noise definition on input data. In some sense, every processing operation may be viewed as a signal estimation process in which the result of the process represents the significant information content of the input data for the particular application, as biased by the processing operation. The inventive method has clarified how the ambiguity of the resulting assignment of input data to either signal or noise should be represented given the assumptions implicit in the process.

An advantage and unusual feature of the inventive method is that it does not require any preconceptions with regard to what kind of signal and noise model is implicit in a process. For a given process, it is possible to interpret it in terms of any number of signal and noise models, regardless of whatever signal and/or noise characteristics the original designer of the process may have had in mind. The fact that the present invention does not require an explicitly defined signal and noise models means that it is versatile and robust.

However, applicants recognize that there are situations were there may be a desire to use the inventive method to compare different processes, input data, signal representations, or uncertainty signals, as examples. In such cases, it would be beneficial to have a method in which implicit signal and noise models could be judged by the same criteria; i.e., if they could be assessed by a standard method of interpretation. For reasons noted, the method should make as few assumptions as possible. It should also be robust in the sense of being applicable to all possible inputs.

Essentially, applicants have recognized that it would be advantageous if the invention provided methods for signal and noise characterization; i.e., if it provided a means of determining the processing function W(v) or its equivalents based on information such as the input data and the resulting estimated signal, and if it also provided a means of defining a signal and noise model given a processing function W(v) or its equivalents. This permits a concise representation of the "black box" signal processing operations which have been implemented by a particular signal processing system in a form which is compatible with the signal processing methods of the present invention.

As noted, the ability to define the signal component is related to how constrained the signal is known to be. In conventional signal processing methods, such knowledge must be available before processing the input data. However, for many data sources, including image sources, the "signal" is too variable to be defined in a precise manner. In these cases, assumptions of what constitutes the signal must be applied. The severity of the misinterpretations that can result depends on the validity of the assumptions. In contrast, the present invention examines the implications of a particular signal and noise model and uses that information to more efficiently process the input data or control an aspect of the processing.

Signal estimation processing according to the present invention is intended to make as few assumptions as possible for the reasons noted, which means that preferably the processing method should embody only that which is robustly expectable. It also means that the processing method should be designed to operate on classes of signals rather than the specifics of any particular signal. This broadens the range of signals and signal classes to which the inventive method can successfully be applied.

The power spectrum of any particular set of data may be written as:

$$|X(v)|^2 = \langle|X(v)|^2\rangle + \delta|X(v)|^2,$$

where $\langle|X(v)|^2\rangle$ is the ensemble-average power spectrum and $\delta|X(v)|^2$ is the deviation from the ensemble average for the particular data set. Also, $$|X_S(v)|^2 = \langle|X_S(v)|^2\rangle + \delta|X_S(v)|^2$$

and $$|X_N(v)|^2 = \langle|X_N(v)|^2\rangle + \delta|X_N(v)|^2$$

denote "signal" and "noise" components. Note that in the above equations, the deviation terms may take on both positive and negative values as opposed to a true power spectrum that everywhere is positive or zero. The ensemble-average power spectrum is an average over all possible sets of the input data. It is an overall expectation rather than a description of any particular set of data.

Likewise, the observed variance of any data set may be considered to be the sum of an expectable component and a deviation from that expectable component:

$$\sigma_X^2 = \langle\sigma_X^2\rangle + \delta\sigma_X^2.$$

Also, $$\sigma_S^2 = \langle\sigma_S^2\rangle + \delta\sigma_S^2 \text{ and } \sigma_N^2 = \langle\sigma_N^2\rangle + \delta\sigma_N^2.$$

The ensemble-average variances are theoretical expectation values, whereas the deviations report the difference between the theoretical value and the actual value for any particular set of data. A Poisson process, for example, has a theoretical variance equal to the mean intensity of the process, but actual observed variances will differ from one observation period to another even if the mean intensity remains the same.

The relationship between the ensemble-average power spectra and the ensemble-average variances may be written as:

$$\int_{-\infty}^{\infty}\langle|X(v)|^2\rangle dv = \langle\sigma_X^2\rangle \int_{-\infty}^{\infty}\langle|K_X(v)|^2\rangle dv,$$

$$\int_{-\infty}^{\infty}\langle|X_S(v)|^2\rangle dv = \langle\sigma_S^2\rangle \int_{-\infty}^{\infty}\langle|K_S(v)|^2\rangle dv$$

and $$\int_{-\infty}^{\infty}\langle|X_N(v)|^2\rangle dv = \langle\sigma_N^2\rangle \int_{-\infty}^{\infty}\langle|K_N(v)|^2\rangle dv$$

with similar equations for the deviation terms. The functions $|K_X(v)|^2$, $|K_S(v)|^2$, and $|K_N(v)|^2$ provide descriptions of the ensemble-average power spectra that are independent from variance. They are normalized functions so that the integrated value over all frequencies of either function is identically 1, e.g., $$1 \equiv \int_{-\infty}^{\infty}\langle|K_S(v)|^2\rangle dv$$

There are two forms of randomness that are generally associated with input data: (1) the randomness of any noise disturbances that are represented by $|X_N(v)|^2$ and related terms; and (2) the randomness of deviations from expectations that are represented by terms such as $\delta|X(v)|^2$. The deviation terms reflect ensemble variability. They are usually ignored because either the signal is considered to be completely knowable a priori, in which case $\delta|X(v)|^2=0$, or the deviations are too unpredictable to be defined a priori.

In the classic estimation problem the goal is to produce a best guess as to the signal component of noisy data. Naturally, the guess must be based on what is expectable and not on what are unpredictable deviations. Except in cases where it is desired to give preferential treatment to particular subclasses of all possible stimuli (e.g., faces or square pulses), there is no real expectation that the signal and/or noise components will have particular phase characteristics. Hence, the least presumptive guess is based on expectations concerning power spectra (or related functions such as correlation functions) alone; i.e., that the "signal" and "noise" components are not assumed to have any expectable correlation, but rather it will be assumed that signal and noise are not correlated to some extent in a particular input. In the present invention, it is presumed that any signal and noise correlation in a particular input is not predictive of the signal and noise correlations in all possible inputs. Thus, the present invention does not presume any particular kind of signal and noise correlation. In such a situation the estimation processing function has an amplitude spectra of the form:

$$|W(v)| = \frac{\langle\sigma_S^2\rangle\langle|K_S(v)|^2\rangle}{\langle\sigma_N^2\rangle\langle|K_X(v)|^2\rangle}$$

or $$|W(v)| = \frac{\langle\sigma_S^2\rangle\langle|K_S(v)|^2\rangle}{\langle\sigma_S^2\rangle\langle|K_S(v)|^2\rangle + \langle\sigma_N^2\rangle\langle|K_N(v)|^2\rangle}$$

Processing operations having this general form can be used to produce an estimate of a signal corrupted by noise where the signal and noise have objective definitions independent from the processing method. When discussing data representative of visual information, the inventors term such processes attribution processes because the ensemble-average signal correlations are really the result of an imaging process, rather than statistically stable correlations in the sources of visual data. Thus, although the form of the filter is mathematically similar to that of a Wiener filter, the assumptions underlying the use of such a filter function in the case of a signal and noise model do not apply in the present situation. In signal processing according to the present invention, a signal and noise model may be assumed, however the invention is directed to an evaluation or analysis of the errors that can be introduced by that model.

As known and used, a Wiener filtering process requires that the signal and noise characteristics be defined and set a priori. The Wiener filter process would be judged to be appropriate only when the input was comprised entirely of a signal and a noise having those predefined characteristics. Any deviations from those characteristics would cause the implemented Wiener filter process to be suboptimal. For these reasons, Kalman-type filters and other filter types which are capable of adapting to changes in the input have largely replaced Wiener filtering processes. The mathematical form of a Wiener filter appears here in the explication of the inventive signal processing method because it serves as a reference by which the least presumptive signal and noise model implicit in a processing operation may be characterized. As such, it also serves as a standard by which to interpret the inventive uncertainty process, task, and signal.

The processing function expressed above weights input data according to power spectral density (the power spectrum evaluated at a particular frequency). Frequency components in the input data that are more likely attributable to the signal component than to the noise component (when considered in terms of power density) are attenuated less than those that are more likely attributable to the noise component. The attribution operation is thus graded in terms of relative expectable power density.

In general, the estimation processing function may be written as:

$$|W(v)| = [1 + b^2 B^2(v)]^{-1}$$

where $$B^2 = <|K_N(v)|^2>/<|K_S(v)|^2> \text{ and } b^2 = <\sigma_N^2>/>\sigma_S^2<.$$

Any method of obtaining the appropriate combination of $|X(v)|^2$, $|X_N(v)|^2$, $<\sigma_X^2>$, $<\sigma_S^2>$, $<\sigma_N^2>$, $<|K_S(v)|^2|>$, $<|K_N(v)|^2>$, $b^2$, or $B^2$ may be used to provide the terms needed to form $|W(v)|$. This includes user or external input, retrieval from a storage source, averaging to obtain approximations, and input-output analysis of existing or hypothetical processing operations. Similarly, any means of obtaining or defining $|W(v)|$, $|U(v)|$, or $|G(v)|$ maybe used to provide the information required to characterize $b^2 B^2(v)$.

Note that $b^2 B^2(v)$ serves as the least-presumptive characterization of a signal and noise model that is implicitly embodied in a processing operation. It also serves as the least-presumptive signal and noise model that should be used in the inventive method.

With the signal estimation processing functions given above, the uncertainty processing function takes the form:

$$|U(v)| = \frac{\langle\sigma_S\rangle\langle|K_S(v)|\rangle\langle\sigma_N\rangle\langle|K_N(v)|\rangle}{\langle\sigma_S^2\rangle\langle|K_S(v)|^2\rangle + \langle\sigma_N^2\rangle\langle|K_N(v)|^2\rangle}$$

or $$|U(v)| = bB(v)[1 + b^2 B^2(v)]^{-1}$$

or an equivalent form.

Similarly, the uncertainty task is characterized by:

$$|G(v)| = \frac{\langle\sigma_{NS}\rangle\langle|K_N(v)|\rangle}{\langle\sigma_S\rangle\langle|K_S(v)|\rangle}$$

or $$|G(v)| = bB(v)$$

or an equivalent form.

Note that variance of the uncertainty signal is an indicator of the root-mean-square error that can be expected in the estimation process.

The error in the signal estimation process can be written as:

$$\xi^2 = \int_{-\infty}^{\infty} |X_S(v) - W(v)X(v)|^2 dv$$

If the overall error in the signal estimation processes is written as $$\zeta^2 = <\zeta^2> + \delta\zeta^2$$

then it can be shown that $<\sigma_D^2> = <\zeta^2>$

Application of the Inventive Method to Processing Visual Image Data

Visual image data is a type of data particularly well-suited to being processed using the inventive method. As described, there are two fundamental characteristics of visual information that create difficulties for conventional processing methods. First, visual information is practically unconstrained. Visual data is any temporal series, spatial pattern, or spatio-temporal sequence that can be formed by light. Whereas many signal processing problems make use of predefined signal characteristics (e.g., a carrier frequency, the transmitted pulse in a radar system, an alphabet), in many cases of interest, visual information arises from sources which are neither controlled nor predefined in any particular detail. Second, the very nature of light itself creates ambiguity. Visual data can only be recorded as a series of photon-induced events, and these events are only statistically related to common parameters such as light intensity and reflectance.

The present invention provides several significant benefits when processing such data:

(1) errors that can be expected in visual processing are reduced;

(2) important aspects of the data can be represented perceptually without the imposition of ad hoc assumptions;

(3) visual information can be represented in a concise form having a narrow dynamic range and stable statistics;

(4) signals suitable for adaptation and error control can be produced;

(5) relatively simple devices can be used to implement the invention, thereby potentially reducing production costs; and (6) the invention can produce indications of ambiguity, frequency content, and motion.

For any collection of objects distributed in space in any arrangement, essentially the only certainty is that the images of the objects will be of different sizes at the image plane. The associated power spectra sum linearly because imaging is a linear phenomenon, and the composite spectrum will tend to fall off with frequency because the more distant objects contribute less to the low frequencies than nearer objects. When integrated over all possible arrangements of all possible objects, it is found that the ensemble-average composite power spectrum tends to fall off with the inverse of the squared-value of the frequency coordinate. Such power spectra are called scale-invariant power spectra. The arguments described above for spatial correlations are easily modified for relative motion, leading to scale-invariance in the temporal domain as well.

Studies of the statistical characteristics of images have been reported by: Field, D. J. (1987) Relationship between the statistical properties of natural images and the response properties of cortical cells. J. Opt. Soc. Am. A. Vol. 4:2379–2394; and Dong, D. W., Atick, J. J. (1995) Statistics of natural time-varying images. Computation in Neural Systems. Vol. 6:345–358. These studies focused on the characteristics of naturally occurring images and image sequences. They found that a majority of individual natural images have an approximately 1/frequency amplitude spectrum. However, applicants herein have found that many graphic images and images of man-made objects do not have the 1/frequency characteristic. However, to promote robust processing the inventive method described herein is directed to classes of inputs rather than to the particulars of individual inputs. Applicants have discovered that, as a class, the ensemble-average amplitude spectrum of images has the 1/frequency characteristic.

Moreover, for subclasses of images, such as images of man-made objects, for example, the ensemble-average amplitude spectrum for the subclass also has a 1/frequency characteristic, even though individual images vary significantly from the ensemble-average. The applicability of the 1/frequency characteristic to images as a class may be considered to be a result of the process of forming an image.

In a general sense, visual images are the two-dimensional (2-D) accumulation of light from a three-dimensional (3-D) environment. The objects in the environment itself have no predictable or ensemble-average statistical relationship to one another, but the act of projection introduces predictability, i.e., distant objects correspond to smaller images and take longer to transit a detector than do nearer objects. This integration, resulting from the compression of 3-D depth into a 2-D image, is described in the frequency domain by a 1/frequency$^2$ power spectra. Using the model of a 1/frequency$^2$ power spectra for visual images, the term $B^2(v)$ in the inventive model is set equal to $v^2$. For the special case $b^2$ set equal to one, the processing function takes the form:

$$W(v)=1/(1+v^2).$$

Note that this frequency dependence of the above attribution process characterization is appropriate for any signal and noise model of the form $A+v^2$, where A is a constant.

The uncertainty filter, U(v) takes the form:

$$U(v)=v/(1+v^2).$$

A more general representation appropriate for any signal and noise model of the form $A+v^2$ where A is a constant may be written as:

$$W(v)=W_0[\alpha^2/(\alpha^2+v^2)]$$

where $W_0$ is a scaling factor having a value of 1 when A=0. The parameter $\alpha^2$ is related to $b^2$ and determines the frequency at which W(v) has half-maximal amplitude.

The corresponding uncertainty process function is:

$$U(v)=W_0[\alpha/(\alpha^2+v^2)][\alpha^2(1-W_0)+v^2]^{1/2}$$

Those skilled in the art will appreciate from the within descriptions of the present invention the corresponding functional characterization of the uncertainty task.

For cases in which the randomness of photon capture is of primary concern, or in any case in which input data is representative of a Poisson process, $\alpha^2$ may be taken to be a linear function of light intensity (the mean rate of events in a Poisson process). For cases in which a fixed noise level is of primary concern, transducer or sensor noise, for example, $\alpha^2$ may be taken to be a function of the square of light intensity. In general, the value of $\alpha^2$ may be determined by comparing an equivalent of the r.m.s. (root-mean-square) power of an uncertainty signal to an equivalent of the r.m.s. power of an input. Note that the inventive method may also be extended to cases in which a noise of concern has an expectable power spectrum inversely proportional to frequency. This sort of noise is often observed in electron amplifiers.

Hardware implementations of the above inventive process functions may be in the form of circuitry for real time processing. A minimum-phase attribution process may be implemented as two identical stages of singe-pole low pass filters. The uncertainty process may implemented in a similar manner and is particularly straightforward when $W_0=1$.

For spatial data, the attribution process may be implemented as a two-dimensional equivalent of a transmission line in which a is representative of a radial length constant. As such it may be incorporated into a sensor or implemented separately. A two-dimensional transmission line equivalent may be implement as a mesh of resistive elements. Nodes in the mesh should have a resistive path to a common ground plane. The effective radial length constant of such an implementation may be controlled by modifying the resistance within the mesh or the resistance in the ground path or both. Resistance modifications may be achieved by using field-effect transistors or similar devices in a mode consistent with a voltage-controlled resistor.

Implementation in programmable devices may take the form of determining digital filtering coefficients consistent with the inventive method. Alternatively, data arrays equivalent to FFT representations may be constructed and used in arithmetic combinations to process data. Functional descriptions and/or the equivalents of inverse FFT representations may also be used in convolution operations. In digital computing devices, it is some times computationally efficient and advantageous to approximate a $v^{-1}$ as the reciprocal of the square root of the absolute value of the FFT of an integer-valued array. A useful array for one-dimensional data is [. . . −1 2 −1. . . ] where the ellipses denote any number of zero-valued entries. A useful set of arrays for two-dimensional data are of the form:

| ... | ... | ... | ... | ... |
|---|---|---|---|---|
| ... | −a | −1 | −a | ... |
| ... | −1 | 4(1+a) | −1 | ... |
| ... | −a | −1 | −a | ... |
| ... | ... | ... | ... | ... |

Where a>0 and the surround of ellipses denotes any number of zero-valued entries. For both the one- and two-dimensional cases, arrays of non-zero values larger than 1-by-3 and 3-by-3, respectively, may also be used. Approximations of the type described may also be used to generate an array of values for use in an equivalent of a convolution operation; e.g., by means of an inverse FFT. Computational efficiency in convolution operations may be enhanced without introducing significant processing error by quantizing the values and/or limiting the number of non-zero elements in a convolution array.

In processing visual image data, the relationship between the uncertainty signal and the phase characteristics of the input demonstrates an advantage of the present invention. The uncertainty signal essentially preserves the information in the phase of the input and extends its utility beyond simple signal estimation. Any linear transformation of the signal component can be estimated by passing the uncertainty signal through an appropriate linear filter or equivalent. Any nonlinear transformation may be produced from the uncertainty signal with exactly the same quality as it could be produced from the signal estimate. Thus, the uncertainty signal does not exclude or restrict subsequent processing operations. Instead, the uncertainty signal serves as a useful core signal on which any number of specific operations can be performed in parallel. In accordance with the present invention, the uncertainty signal, instead of the traditional source intensity, may be considered as the primary signal in visual processing.

Most of the unique features of a particular set of visual data are represented by its phase spectrum. The amplitude spectrum describes overall correlations without regard to when or where they occur. The phase spectrum describes the locations and times of particular features without regard to overall correlations.

The overall correlations in visual data have been described in terms of expectable power spectra. The unique details of any particular data set are therefore entirely described by the phase spectrum and the deviation of the particular power spectrum from the ensemble-average. These are the components which contribute to the uncertainty signal. In a sense, the uncertainty signal for visual or any other data is representative of an estimate of the phase characteristics of an input. However, unlike a true whitening processes, the uncertainty process does not produce a true representation of phase characteristics because the uncertainty signal also represents aspects of an input which are indicative of ensemble variability.

One advantage of the present invention in visual processing is that the uncertainty signal emphasizes those aspects of the input data that are most likely to distinguish that particular data set from data sets in general. This is a perceptual emphasis as the unique features are those to which the human visual system is most sensitive. In essence, the uncertainty signal emphasizes the details of the input data and in one aspect, the present invention may thus be considered a method of detail enhancement.

It is the lack of constraint of visual data that has been so problematic in other visual processing methods. Ad hoc assumptions concerning biological visual performance have had to be made regarding what is and what is not perceptually important. The inventive method emphasizes features without employing such assumptions, and hence is not prone to any of the disadvantages or bias effects resulting from such assumptions.

Because the uncertainty signal preferentially represents details, it may be used to enhance the perceptual qualities of the estimated signal component. Note that the power spectrum of the expectable component of the estimated signal may be written as:

$$<|X_S^{40}(v)|^2> = |W(v)|<|X_S(v)|^2>.$$

The expectable component of the ambiguous power may be written as:

$$<|D(v)|^2> = (1-|W(v)|)<|X_S(v)|^2>.$$

Hence, their sum may be written as:

$$<|X_S^{40}(v)|^2> = <|D(v)|^2> = <|X_S(v)|^2>.$$

This is another way of saying that the power in the uncertainty signal provides a measure of the expectable error in a signal estimation process.

A further advantage of the present invention for visual processing is that the uncertainty signal provides a means of boosting the frequency content of the signal estimate. Adding the uncertainty signal to the estimate of the signal component tends to sharpen perceptually significant features such as edges and areas of sharp contrast discontinuities. Subtraction has the opposite effect, tending to blur those features. The subtractive technique is useful in de-emphasizing the pixelation apparent in low resolution images. The additive technique is useful in sharpening blurred text and aesthetic manipulation of faces, for example. The ease with which such image processing operations may be implemented using the methods of the present invention is a significant benefit of the invention. Usually, such operations require the use of bandpass, highpass, and lowpass filters or equivalents rather than simple and efficient addition and subtraction, as is made possible by the present invention.

Data Quantization

Just as the present invention provides a technique for reducing the processing errors introduced by adoption of a conventional signal and noise model, it can also be used to develop a more efficient method of quantizing data. Consideration of the same principles underlying the data processing methods of the present invention permits development of a quantization scheme which overcomes many of the disadvantages of conventional methods.

The term quantization is used herein to mean the process by which the intrinsically continuous uncertainty signal is converted into a discrete signal. It is essentially an analog-to-digital conversion but the discrete output need not be converted to binary form. The inventive quantization method is similar in concept to the attribution method previously described. It produces a discrete version of the uncertainty signal so that the statistically expectable difference from the original is a minimum, thereby providing a quantization procedure which is consistent with the fundamental assumptions of the invention Applicants' quantization method described herein is not limited to data representative of visual sources, and may be used to quantize data having any distribution of values. The quantization may be fixed in the sense of having predefined quantization levels, but the method described can also be used to adapt to changes in a distribution of values over time. For visual data, it is often advantageous to expect that the uncertainty signal will have a Laplacian probability distribution (in the ensemble-average sense) and to set the quantization levels according to that expectation. The quantization method may also be used iteratively; i.e., original data may be quantized, the quantized representation may then be compared to the original data or an updated set of data, the difference between the quantized data and the reference data may then be quantized. Source data may be approximated by summing the successive iterations of quantization. This procedure is useful for spatio-temporal data such as video.

There are three sets of parameters required to understand the inventive quantization method: (1) state boundaries, (2) state numbers, and (3) state values, which can be referred to as interpretation values. Sequential pairs of state boundaries define the edges of a bin. All values within the bin are assigned a state number. The state numbers form an integer series having N members, where N is the total number of states. The process of "binning" the uncertainty signal results in a discrete version having N possible states. There are also N state values, but they do not necessarily form an integer series. Instead, they are determined so that the overall error in quantization is minimized. The state numbers are an index to the state values and boundaries.

The expectable integral squared quantization error $(<\xi_Q^2>)$ may be written as:

$$\langle \xi_Q^2 \rangle = \sum_{n=1}^{N} \int_{\delta_{n-1}}^{\delta_n} (d - \bar{\delta}_n)^2 p(d) \partial d$$

Here $\delta_n$ are state boundaries, $\bar{\delta}_n$ are state values, and n are the state numbers.

The integration parameter d represents the domain of the uncertainty signal, not the actual values of a particular uncertainty signal. The function $\rho(d)$ is used to represent a histogram or probability distribution.

The goal is to minimize the expectable error. Let $\Delta \zeta_n^2$ denote the portion of the total error that is associated with state n; i.e.

$$\langle \xi_Q^2 \rangle = \sum_{n=1}^{N} \Delta \xi_n^2.$$

There are then two tasks: (1) find the set of state boundaries which minimizes error, and (2) find the set of state values that minimizes error.

The selection of a state boundary influences the error associated with both of the adjacent bins (states). Thus, it is necessary to find $\delta_n$ such that $\Delta \zeta_n^2 + \Delta \zeta_{n-1}^2$ is a minimum. The solution obtained via differentiation is: $\delta_n = (\overline{\delta}_n + \overline{\delta}_{n+1})/2$, i.e., the state boundary is exactly halfway between the state values. Thus, the state boundaries are completely determined by the state values.

The state value influences only the error associated with its own state. Using differentiation, the appropriate state value is equal to the integral over the bin of dp(d) divided by the integral over the bin of p(d). For a Laplacian distribution, the state values are given by:

$$\overline{\delta}_n = \frac{(\beta + \delta_{n-1})\exp(-\delta_{n-1}/\beta) - (\beta + \delta_n)\exp(-\delta_n/\beta)}{\exp(-\delta_{n-1}/\beta) - \exp(-\delta_n/\beta)}$$

where $\beta$ is the mean absolute value of d. For any particular uncertainty signal, $\beta^2 = \sigma_D^2/2$. The state values are best obtained by noting that $\overline{\delta}_N = (\beta + \delta_{N-1})$ because $\delta_N \to \infty$. This gives a starting point from which to calculate other state values and state boundaries using numerical methods or resistive ladders.

Note that exponential functions, like the Laplacian, display a sort of scale-invariance. The shape of the function from any point, $\delta_n$, to $\infty$ is exactly the same as from zero to $\infty$, the difference being simply in the amplitude. With regard to state values, this means that the sequence $(\overline{\delta}_n - \overline{\delta}_{n-1})$ is independent of the total number of states. The number of states dictates the number of elements of the sequence that are relevant. In essence, increasing the number of quantization states adds the new states near zero, thereby pushing the other state parameters away from zero without changing their relationship to one another. Hence, $(\overline{\delta}_n - \overline{\delta}_{n-1})$ is a mathematical sequence that only needs to be calculated once and stored; it need not be recalculated every time a signal is to be quantized. It is sometimes advantageous to use the recursive properties to quantize only the tails or other portions of a distribution. Applications where this may be useful include feature extraction, compression, and emphasis/de-emphasis operations.

The usual means by which visual data is made discrete involve A-to-D conversion of the intensity. For good quality images, the number of states employed is often 256 or greater. An advantage of the inventive method of quantizing the uncertainty signal instead of the input data is that the same degree of quality as judged in terms of root-mean-squared error is obtained with significantly fewer states (8 to 16 is typical). This significantly reduces storage capacity requirements.

Another advantage of the inventive quantization method stems from the fact that perceptually relevant aspects of the input data tend to be associated with large values in the uncertainty signal. The quantized version may therefore be sorted by state value so that the information may be stored or transmitted in order of likely perceptual significance. This has implications for efficient image recognition, and the storage, transmission, and manipulation of a minimal set of data. The prior art manner in which visual data is traditionally recorded in discrete form does not permit such a benefit.

Note that the error in quantization (the difference between the original and the quantized version) also tends to have a Laplacian distribution. This means that the if the method is used recursively on a stored version of the input data, or on a spatial array of input data that varies with time, it will continually update the quality of the quantized information without any additional effort or constraint.

Further with respect to the quantization process, conversion of the uncertainty signal into a discrete version of state numbers is independent of the interpretation of those state numbers with state values. This means that the state number representation may be stored or transmitted instead of the state value representation; i.e., the dynamic range requirements are set by the number of states and not the power or range in either the original uncertainty signal or input data. The receiver of the state number representation needs only to apply the already known state values to obtain a minimal-error version of the original uncertainty signal.

Efficiency of the quantization according to the present invention can be improved if the uncertainty signal or other input is normalized by an estimate of its variance before being quantized. This allows the interpretation values to be scaled as a group rather than individually. It also tends to reduce the "search time" when the state boundaries are free to adapt to changes in the input. For data expected to have a Laplacian distribution, the variance of the data may be estimated from the mean absolute value of the data, thereby avoiding computationally more intensity squaring operations.

General Applications of the Invention

Although the preceding exemplary description has emphasized application of the present invention for processing visual data, the invention may be described as having three primary classes of applications:

(1) To generate a figure of merit to evaluate and permit comparison between the effectiveness of different signal processing schemes;

(2) To generate a control term for use in adapting, modifying, or other wise controlling the implementation of a signal processing operation; and (3) As an intermediate form of processed data, to which other signal processing operations can be applied to perform further analysis in a more computationally efficient manner with reduced data storage requirements. This form of using the invention facilitates data transmission and compression operations, among others.

Figure 5A:
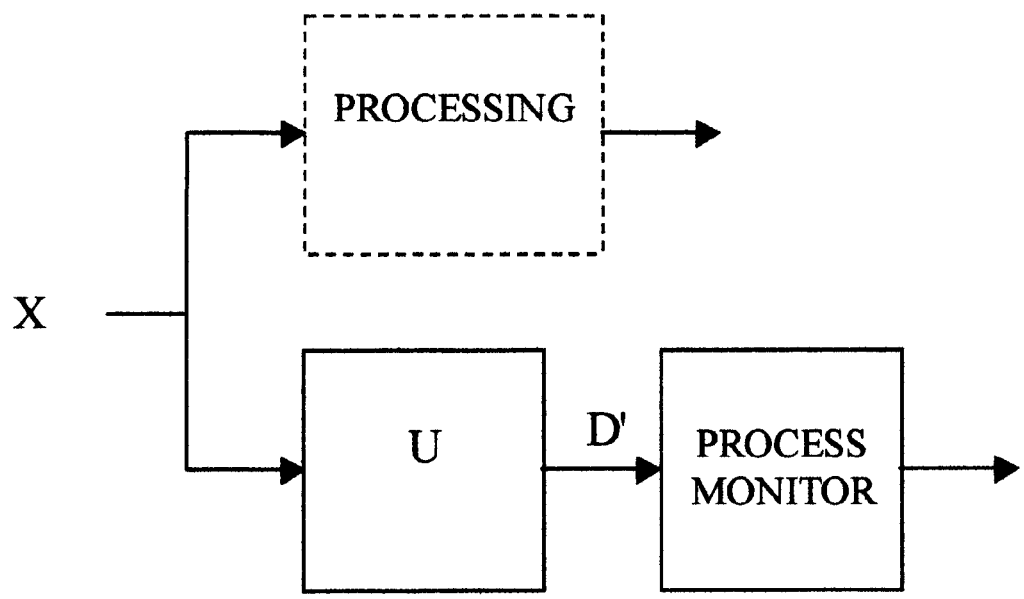
FIG. 5 is a block diagram illustrating how the present invention may be used to generate a figure of merit for purposes of monitoring a signal processing operation.

FIG. 5 is a block diagram depicting use of the present invention to generate a figure of merit for purposes of monitoring a signal processing operation. As shown in FIG. 5a, in such an application of the invention, the signal processing operations performed on a set of input data, X(v), to produce an estimated signal, S'(v) is characterized by a "black box" (labeled "Processing" in the figure). Both the input data and estimated signal are represented as functions or data sets in a generalized frequency space.

Figure 5B:
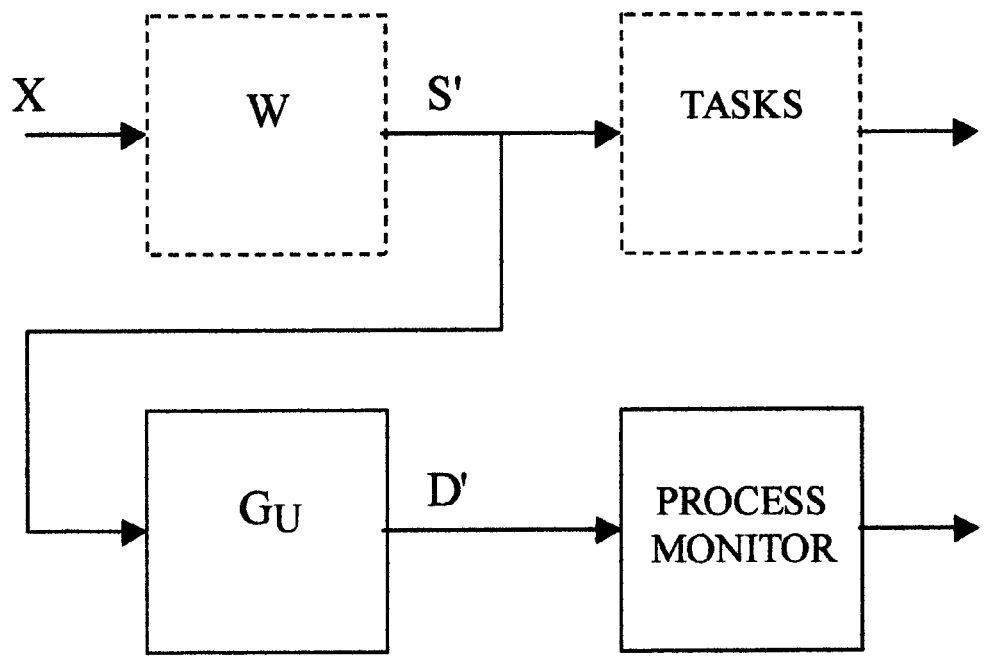

In this embodiment of the invention, input data, X, is operated on by the uncertainty process U to produce the uncertainty signal D', which may then be input to one or more process monitors. Alternatively, D' may be obtained from a signal estimate or representation, S', operated upon by $G_u$, the uncertainty task, as shown in FIG. 5b. The signal estimate or representation may exist alone or be produced by operating on the input, X, with an attribution process, W.

Process monitoring operations may include: comparing values representative of D', such as the absolute value, quantized value, cumulative value, or root-mean-square power of D', to a set of defined values or functions; comparing values representative of transforms of D', such as an FFT transform, to a set of defined values or functions; comparing data representative of variations in D' to a defined set of functions such as a set of wavelet functions or other basis functions; producing a record, indicator, or alarm when certain relationships between D' and defined values and functions are met.

Figure 6A:
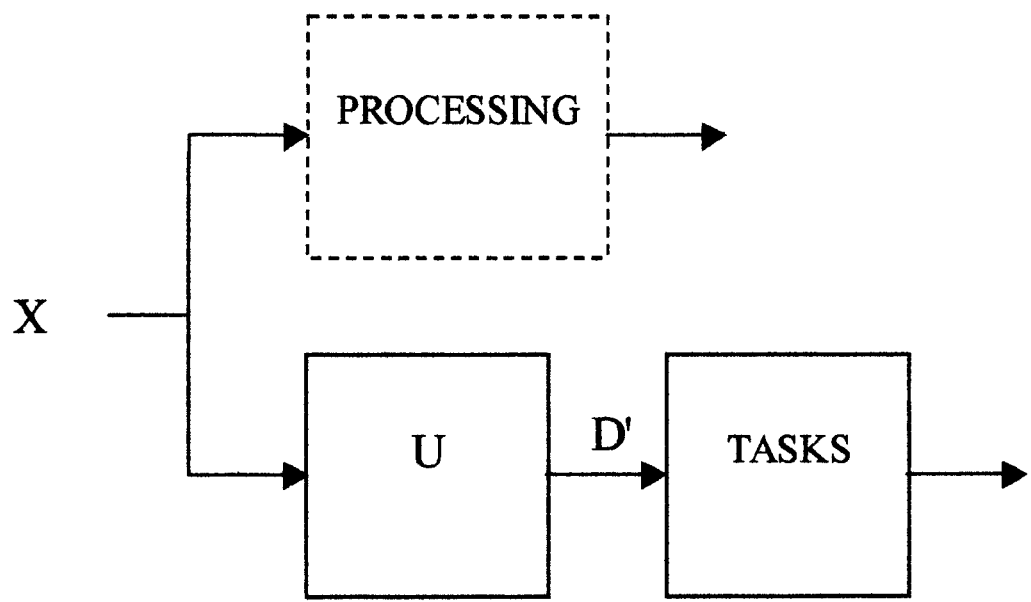
FIG. 6 is a block diagram illustrating how the inventive uncertainty signal may be used as an intermediate form of processed data to replace a signal representation prior to application of additional processing operations.
Figure 6B:
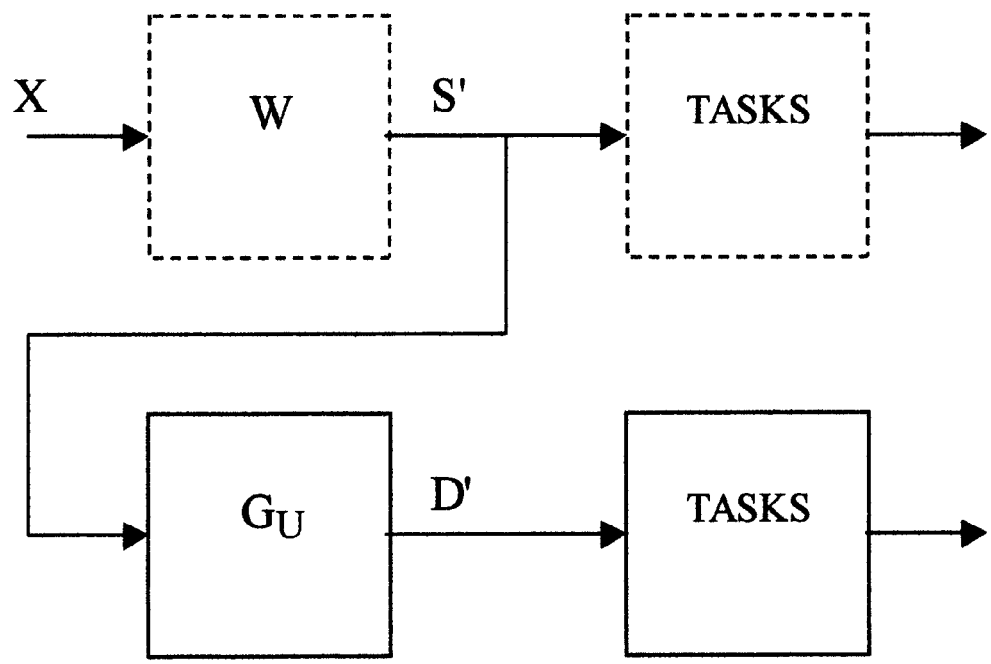

FIG. 6 is a block diagram illustrating how the inventive uncertainty signal may be used as an intermediate form of processed data to replace a signal representation for the application of additional processing operations. As shown in FIG. 6a, input data, X, which is typically provided to a process (labeled "Processing" in the figure) is instead operated on by the uncertainty process, U, to produce D', the uncertainty signal. The uncertainty signal is then input to one or more processing task operations (labeled "Tasks" in the figure). Alternatively, as shown in FIG. 6b, D' is obtained from a signal estimate, S', which is then operated on by $G_u$, the uncertainty task. The signal estimate or representation may exist alone or be produced by operating on the input, X, with an attribution process, W.

In addition to those possible tasks described in conjunction with FIG. 5, other processing tasks can include, without limitation: thresholding operations in which only values of D' within a certain range are passed on to an output; translation and rotation operations; morphological transformations such as warping or lensing distortions applied to image data for aesthetic effect; feature extraction using methods such as quantization, threshold, and frequency selection methods; feature emphasis and de-emphasis; root-mean-square normalization; and combinations of such operations or methods.

Figure 7A:
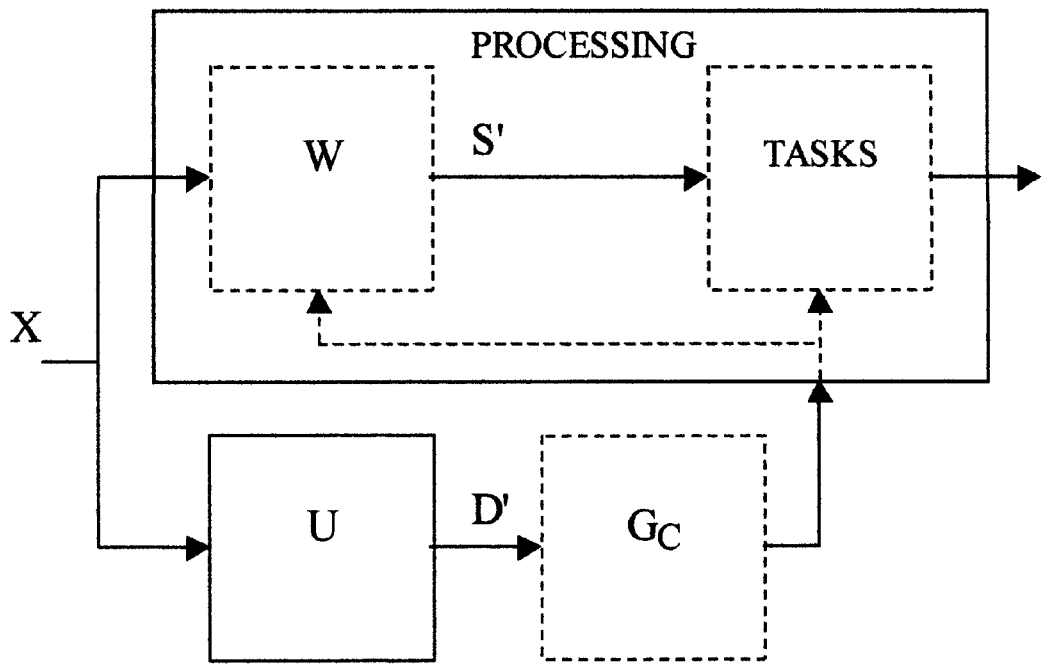
FIG. 7 is a block diagram illustrating how the inventive uncertainty signal may be used to control the operation of processes and/or processing tasks.
Figure 7B:
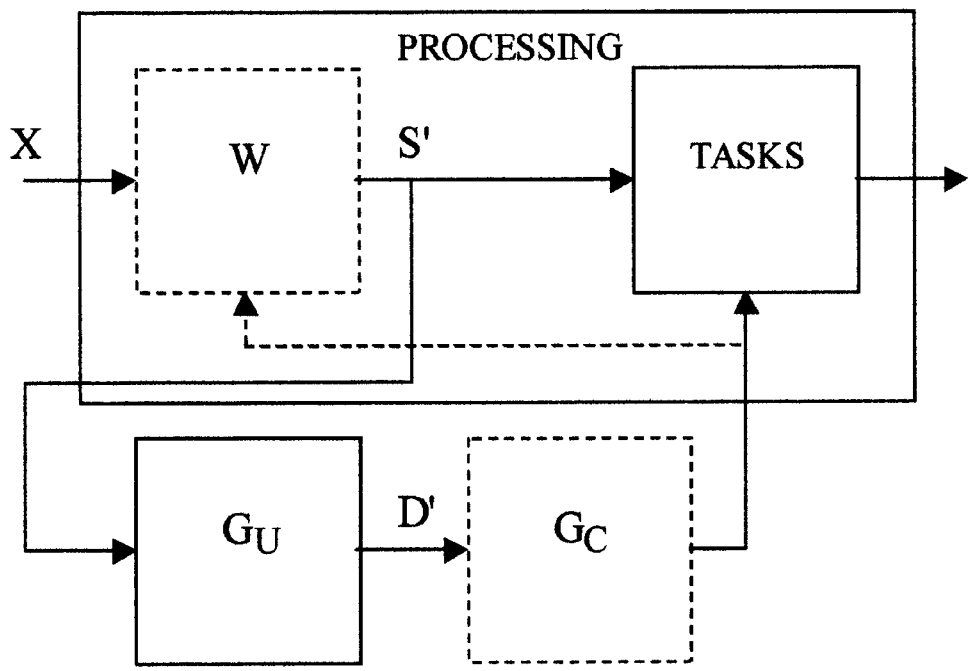

FIG. 7 is a block diagram illustrating how the uncertainty signal may be used to control the operation of processes and/or processing tasks, according to the present invention. As shown in FIG. 7a, input data X, is subjected to a set of signal processing operations implemented by a processor (labeled "Processing" in the figure), and is operated upon by the uncertainty process, U, to produce D', the uncertainty signal. The uncertainty signal is provided to the processor as a control signal. The processor may implement an attribution process, an attribution process in conjunction with one or more processing tasks, or may not be divisible into separate attribution and task stages. Alternatively, as shown in FIG. 7b, the uncertainty signal may be obtained from a signal estimate S' which is then operated upon by $G_u$, the uncertainty task. The signal estimate may exist alone or be produced by operating on the input, X, with an attribution process, W. In any case, D' may optionally be operated on by a control task, $G_c$.

The uncertainty signal, or its post control-task representation, may be used to control: the selection of processes or processing tasks; the rate at which data are to be sampled or coded; the amount by which data are to be emphasized or de-emphasized; the selection of dithering characteristics such as type, density, and diffusion; the dynamic range of a signal at any stage of processing by such means as variance or root-mean-square power normalization; the amount and/or kind of resolution reduction or enhancement; the number and/or kind or coefficients to be retained in compression schemes such as JPEG, MPEG, fractal, and wavelet-based methods; the quantization criteria or threshold levels to be applied to data; the characteristics of an attribution process; or any combination of such operations.

The control task operations can include, without limitation: means for producing a signal that is representative of the root-mean-square value of D' and/or S', and/or X'; rectification; quantization; thresholding; low-, band-, and high-pass filtering methods; and any combination of such operations.

Figure 8A:
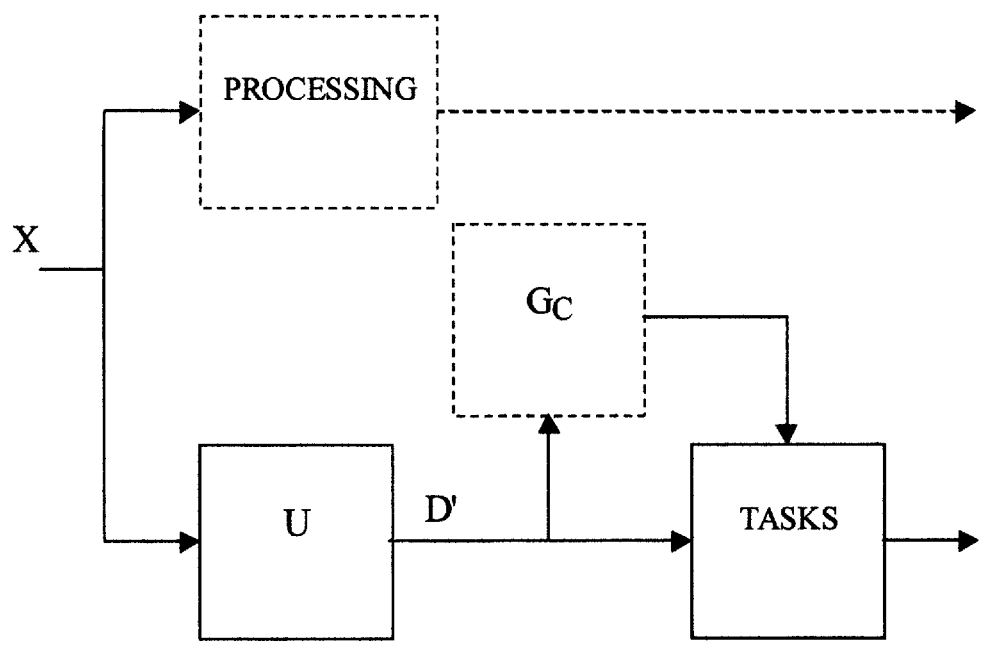
FIG. 8 is a block diagram illustrating a second manner in which the inventive uncertainty signal may be used to control the operation of processes and/or processing tasks.
Figure 8B:
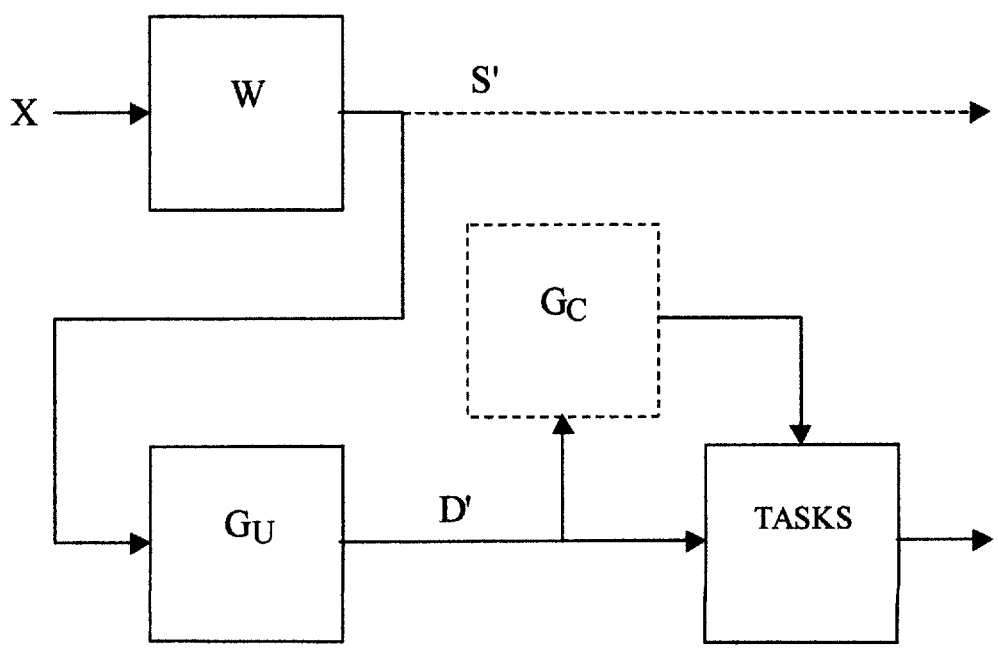

FIG. 8 is a block diagram illustrating a second manner in which the inventive uncertainty signal may be used to control the operation of processes and/or processing tasks. The difference between FIGS. 8a and 8b and FIGS. 7a and 7b is that in FIG. 8 the uncertainty signal is used control operations performed on the uncertainty signal.

Figure 9A:
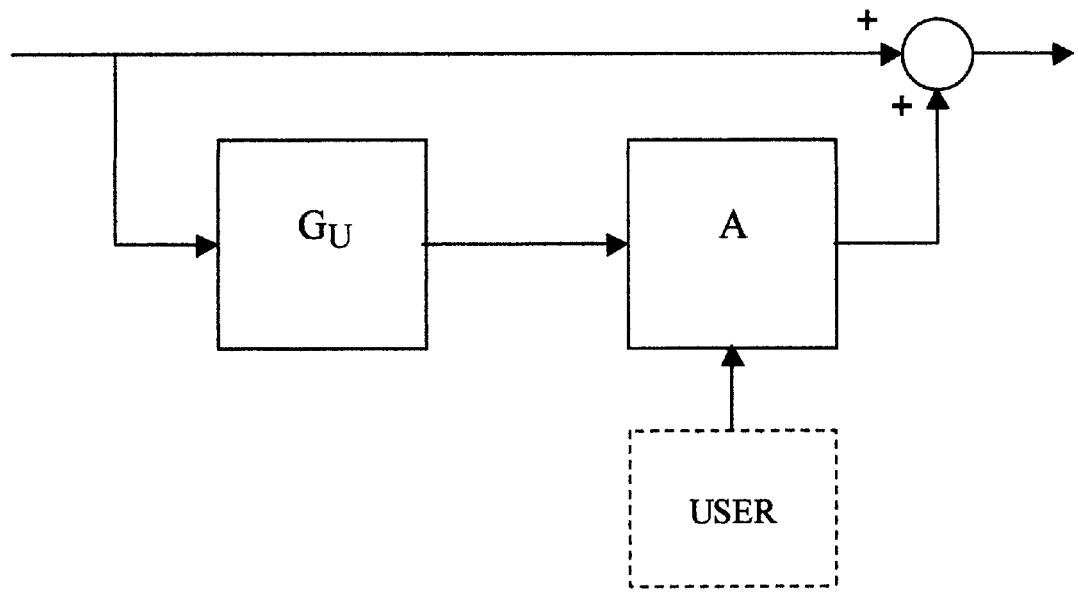
FIG. 9 is a block diagram illustrating how the inventive signal processing methods may be used to perform data emphasis and de-emphasis.
Figure 9B:
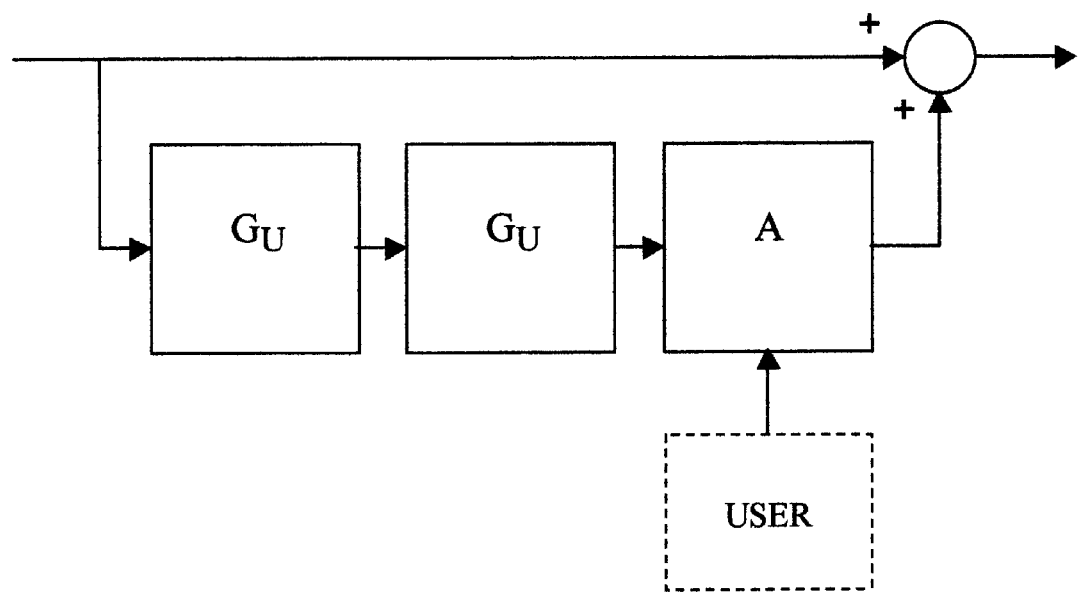

FIG. 9 is a block diagram illustrating how the inventive signal processing methods may be used to perform data emphasis and de-emphasis. As shown in FIG. 9a, input data, typically a signal estimate or signal representation, is presented to the uncertainty task, $G_u$, which is then scaled by a constant value, A. The result is added to the original input data to produce an output. FIG. 9b shows the same process but having the equivalent of two uncertainty tasks in series. The constant A may be fixed, alternately, it may be controlled by a user or external process.

The method shown in FIG. 9a preferentially adds or subtracts the unique and uncertain features of the input data to the input data thereby emphasizing or de-emphasizing those features. The method shown in FIG. 9b provides a means of compensating for errors that may have been introduced during prior processing of the input data.

The value of the constant A may range from positive to negative infinity, although in practical applications values of A in the range of plus and minus 1 will be sufficient. Positive values of A will produce emphasis, negative values will result in de-emphasis.

If applied to audio data, de-emphasis will tend to muffle sounds and/or reduce hiss, while emphasis will tend to have the opposite effect. When applied to image data, de-emphasis will tend to be perceived as blurring or smoothing, whereas emphasis will be perceived as image sharpening and contrast enhancement. Allowing (A) to be set by a user or external process provides a means for controlling the dynamic range or root-mean-square power of the output to achieve a desired perceptual condition.

Typically, to achieve a continuous range of emphasis and de-emphasis, or smoothing and sharpening, the properties of a filter or convolution method need to be adjusted in a continuous manner. In essence, a different filter would be needed for each level of emphasis/de-emphasis. In contrast, the inventive method achieves a similar effect by adjusting a scalar multiplier.

Figure 10A:
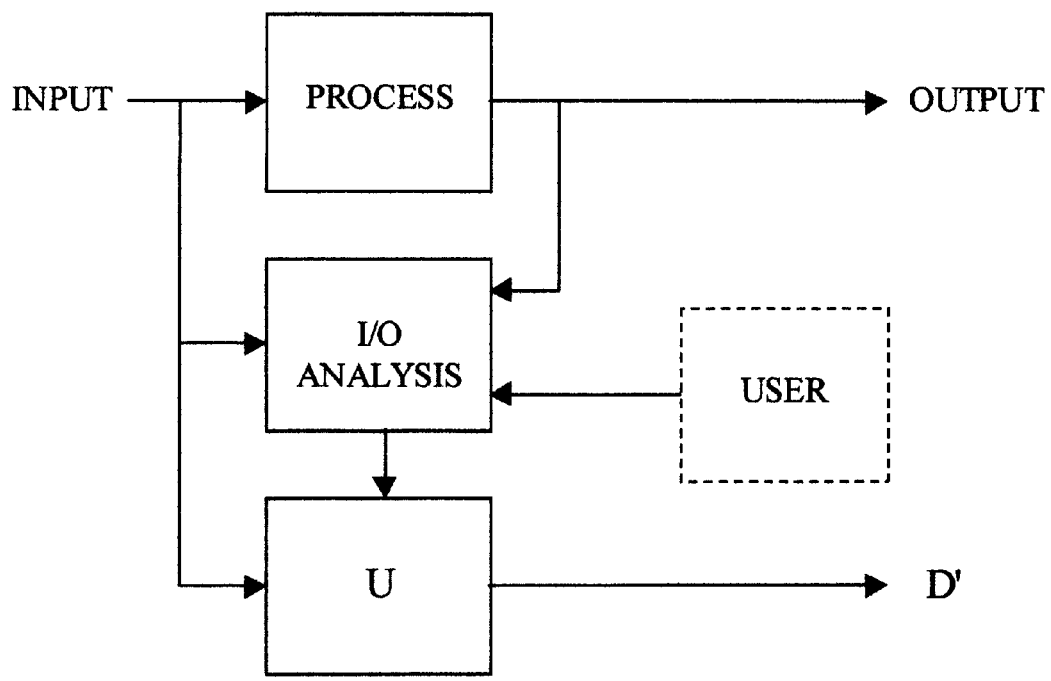
FIG. 10 is a block diagram illustrating the use of the inventive signal processing methods for constructing an uncertainty process from a pre-existing or hypothetical signal or data processing operation.
Figure 10B:
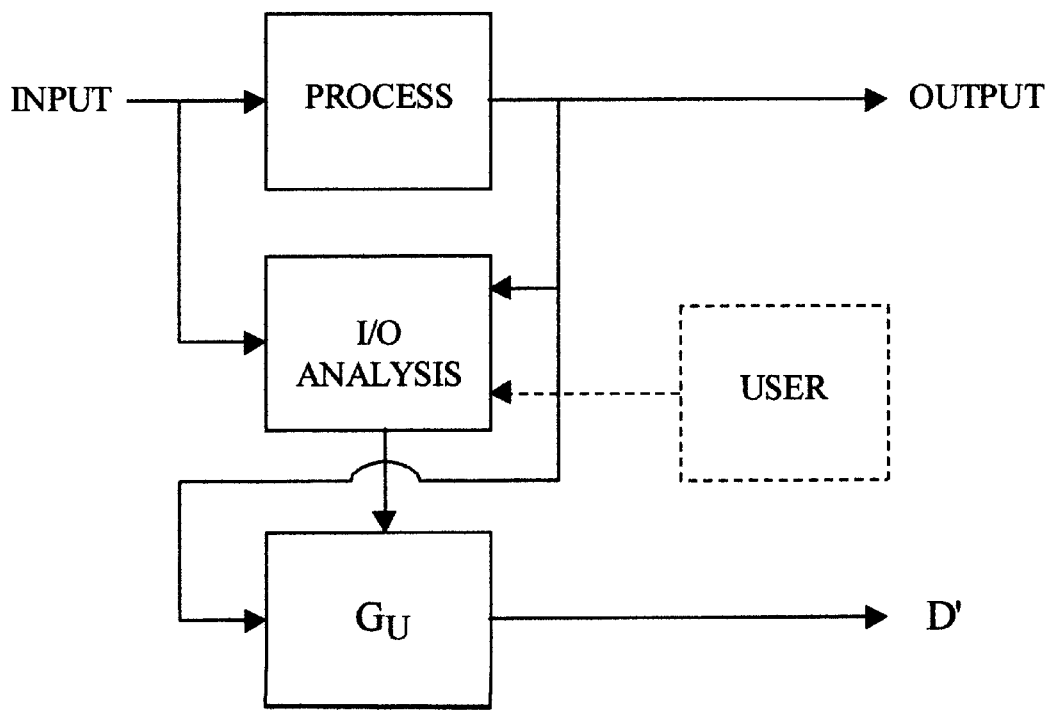

FIG. 10 is a block diagram illustrating the use of the inventive signal processing method for constructing an uncertainty process from a pre-existing or hypothetical signal or data processing operation (labeled "Process" in the figure). As shown in FIG. 10a, the Input and Output of the Process are supplied to an input/output analysis block (I/O Analysis). The input is also operated upon by an uncertainty process, U. Alternately, as shown in FIG. 10b, the Output may be operated upon by an uncertainty task, $G_u$, where the properties of the uncertainty process and/or uncertainty task are determined by the results of the I/O Analysis. Typically, that actual processing of the input data by the uncertainty process or task would be performed by a programmable device by convolution, digital filtering, or arithmetic operations performed on frequency domain representations. Optionally, a user or external process such as a database system, may provide scaling and processing task information to the I/O analysis method.

Given that the output of a processing operating may depend in some non-linear manner on the characteristics of the input data, the method described above provides an adaptive means of quantifying the ambiguity inherent in the relationship between the input, output and processing method, as well as a means of characterizing the processing method and the associated ambiguity. This characteristic of the method may prove advantageous when the input data is derived from several different sources or prior processing operations, such as may be the case in a multiplexing system. Typically, a processing method needs to be designed and implemented to encompass the degree of freedom allowed to the range of possible inputs. In many cases, the range of inputs and their degree of freedom has to be constrained to satisfy the need for processing efficiency. In contrast, an advantage of the inventive method is that providing the uncertainty signal for use in process monitoring and control reduces the tightness of the constraints which might otherwise be necessary in the design of inputs and processing operations.

Figure 11A:
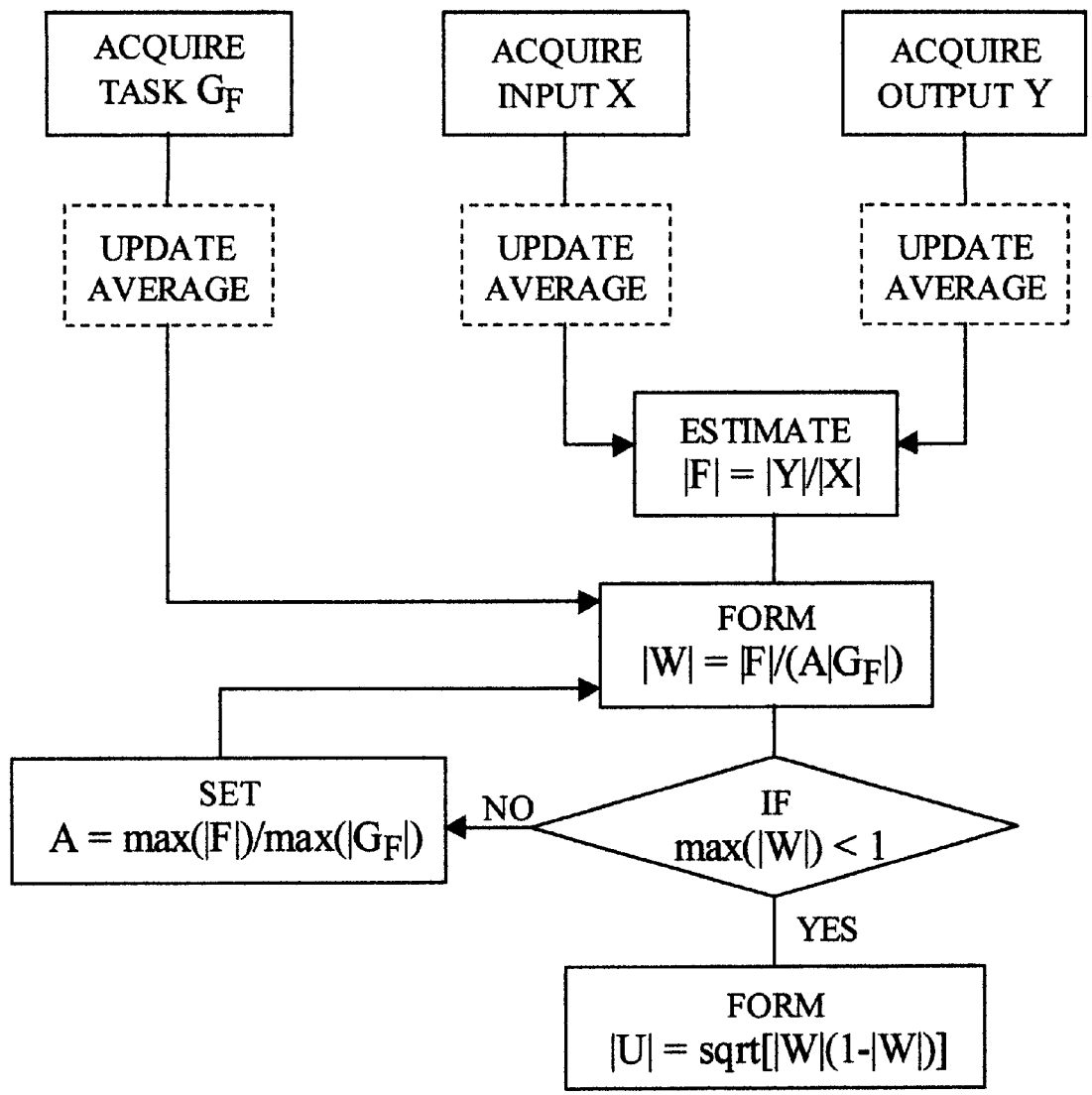
FIGS. 11a and 11b are flow charts showing primary signal processing steps implemented to determine the uncertainty filter and uncertainty task from an I/O analysis of a processing scheme according to the method of the present invention.
Figure 11B:
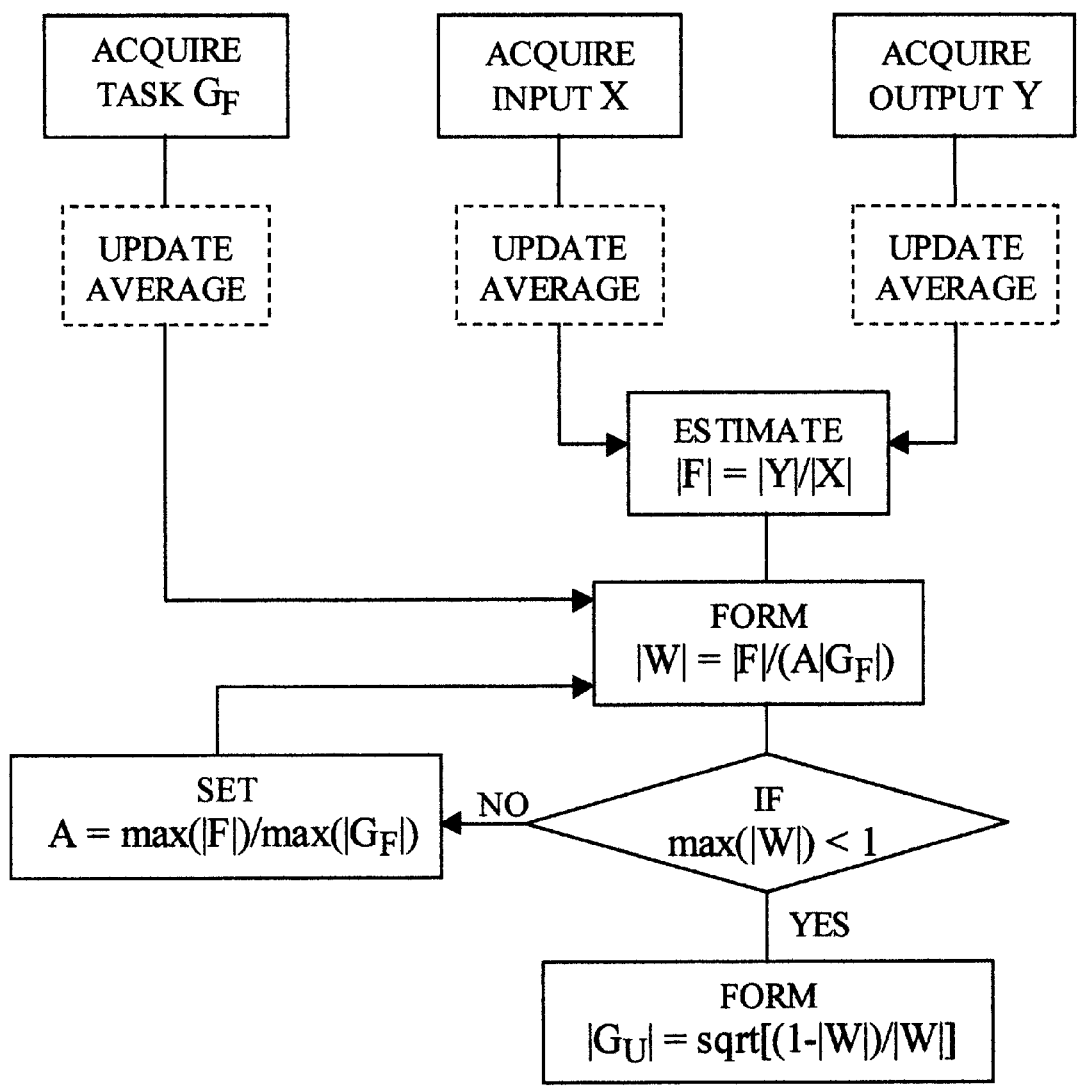

FIGS. 11a and 11b are flow charts showing the primary signal processing steps which are implemented to determine the uncertainty filter, U(v), and uncertainty task, $G_u$, based on an I/O analysis of a processing scheme according to the method of the present invention. As shown in FIG. 11b, the I/O analysis described with reference to FIGS. 10a and 10b can be used to provide the information required to construct the uncertainty task. This is both necessary and sufficient to construct an attribution process and an uncertainty process.

Information equivalent to a scaling constant, A, and an estimate of the amplitude spectrum of the effective input/output response function, |F|, is sufficient to define the uncertainty task. Optionally, information equivalent to an amplitude-spectrum description of a known or supposed processing task, $|G_f|$ may be supplied. If $|G_f|$ is not available, it may be set to a value of 1 for all values of the generalized frequency.

Given the input data and estimated signal, the process function F(v) is determined from |F(v)|=|Y(v)|/|X(v)|, as shown in the figures. Next, the processing task function, $G_f(v)$, is assumed, where F(v)=$G_f(v)$W(v), and W(v) is the generalized signal interpretation function. As noted, $G_f(v)$ may be a smoothing operator, or other form of weighting function, with the constraint that 0≤|$G_f(v)$|≤|F(v)| for all v. Next, the following term for the signal interpretation function is formed:

|W(v)|=|F(v)|/(A|$G_f(v)$|).

The scaling constant, A, is adjusted as needed to satisfy the condition of max |W(v)|<1, by setting A=max (|F(v)|)/max (|$G_f(v)$|).

The uncertainty process function |U(v)| function is then obtained from:

|W(v)|(1-|W(v)|)$^{1/2}$, as shown in FIG. 11a. The uncertainty processing task, $G_u$, may also be formed as a result of the I/O analysis from:

((1-|W(v)|)/|W(v)|)$^{1/2}$, as shown in FIG. 11b.

Note that the expressions for |U(v)| and $G_u(v)$ do not specify the phase characteristic of the respective processes. In cases where the input and/or output data takes the form of an array, such as is the case for a still image, and in cases where input and/or output data is stored in a buffer while awaiting processing, it is appropriate these functions have a zero-phase characteristic. In cases in which it is desirable that data be processed in real time (or nearly so), it is preferable that the functions have phase characteristics which are as close as possible to those which characterize the class of filters known as minimum-phase filters. Implementation of such filters is known to those skilled in the relevant art, and can include methods related to spectrum and cepstrum analysis.

Several approaches may be used in estimating |F|. Arguably the simplest approach is to estimate |F| from spectral estimation of a stored example of the input and output data, or from averages derived from several instances of spectral estimation.

The I/O analysis described with reference to FIGS. 11a and 11b provides a representation of the signal-to-noise characterization inherent in the black box of the signal processing operations. Under some circumstances it may be more readily determined than a signal-to-noise ratio based on conventional definitions and processing methods.

Applying U(v) to the input data, X(v) provides the ambiguous component (previously termed D'(v)) of the processing relationship described by F(v). This is a figure of merit which indicates the quality of the processing operations used to extract the signal estimation from the input data. A similar figure of merit may be determined for multiple possible processing operations and compared to decide which such operation will process the input data while reducing the errors in the processing scheme arising from the imposed signal to noise model.

Another application of the present invention in image processing is to partition an image into a set of blocks and use the uncertainty representation to compare the benefit of each of a group of possible image processing operations on each block. This permits the selection of the "optimal" processing operation for each block, thereby providing another method of enhancing or correcting image data.

FIG. 12 is a block diagram illustrating methods of implementing the attribution process, uncertainty process, uncertainty task, and relevant inverse processes in accordance with the present invention. The relationship between the attribution process, uncertainty process, and uncertainty task provides a significant degree of flexibility in the processing scheme used to obtain the benefits of the present invention because any one of the processes or tasks may be obtained using the other two and/or their inverses. Note that the order of the operations shown in the figure is not the only one capable or providing the desired end result. The sequence of operations shown are preferred for most applications but variations are also possible.

The present invention affords several advantages when implementing the sequence(s) of operations shown in the figure. When implemented by a programmable device, the process functions may be represented in forms such as discrete frequency-domain representations, digital filter coefficients, and/or convolution matrices. Less storage space is required to store two such representations than would be required to store all three. In addition, implementation of one of the processes by means of the others will typically provide useful intermediate results.

For example, the use of U and $G_u$ to obtain an attribution process, W, will produce D', the uncertainty signal, and N', a noise estimate, in addition to S', the signal estimate. In this and similar cases, there is a saving of computational resources because the step of addition used to produce S' is simple compared to a convolution operation or an equivalent, which would be required in many conventional signal processing schemes. In some cases there may also be a reduction in data storage requirements because D', for example, contains informative content sufficient to produce S' and/or N'. Hence, in this case only D' would need to be stored for subsequent operations to produce S'. The implementation of one process by means of the other two also allows for other intermediate processes to be inserted or performed in parallel. For example, in the implementation of W by means of U and $G_u$, the intermediate result D' may be subjected to another processing operation such as coding/decoding, resolution reduction, compression, quantization/dequantization, transmission/reception, storage/retrieval, or any combination of similar operations.

The intermediate result can also be extracted for use in process monitoring and/or control. Another advantage of such a modular method of implementation is that it may be used to avoid problems with the realizability of any one of the processes. For example, it may not be possible or perhaps is simply inefficient, to directly construct a particular instance of an attribution process. Such a situation may occur when round-off errors and/or division-by-zero issues arise in programmable devices. In hardware implementations, it may prove difficult to implement a process having the appropriate response profiles in terms of both phase and amplitude, while another of the processes or their inverses may be more easily or efficiently implemented. In these cases, the modular method provides for "work-around" solutions.

As an example, the uncertainty process for data representative of a two-dimensional image may not be efficiently implemented outright. However, the appropriate attribution filter may be constructed as the equivalent of a two-dimensional transmission line and may be built into an image sensor. Hence, the uncertainty process can be performed by implementing the attribution process followed by $G_u$. $G_u$ could be implemented by any means which effectively resulted in spatial differentiation. Alternately, U could be obtained by mean of W and $1/G_u$. For this example, $G_u$ could be approximated by use of another two-dimensional transmission line equivalent having a characteristic radial length constant at least several times larger than that of the attribution process, or it could be implemented by any other process, such as an accumulator, which would effectively result in spatial integration.

Figure 12A:
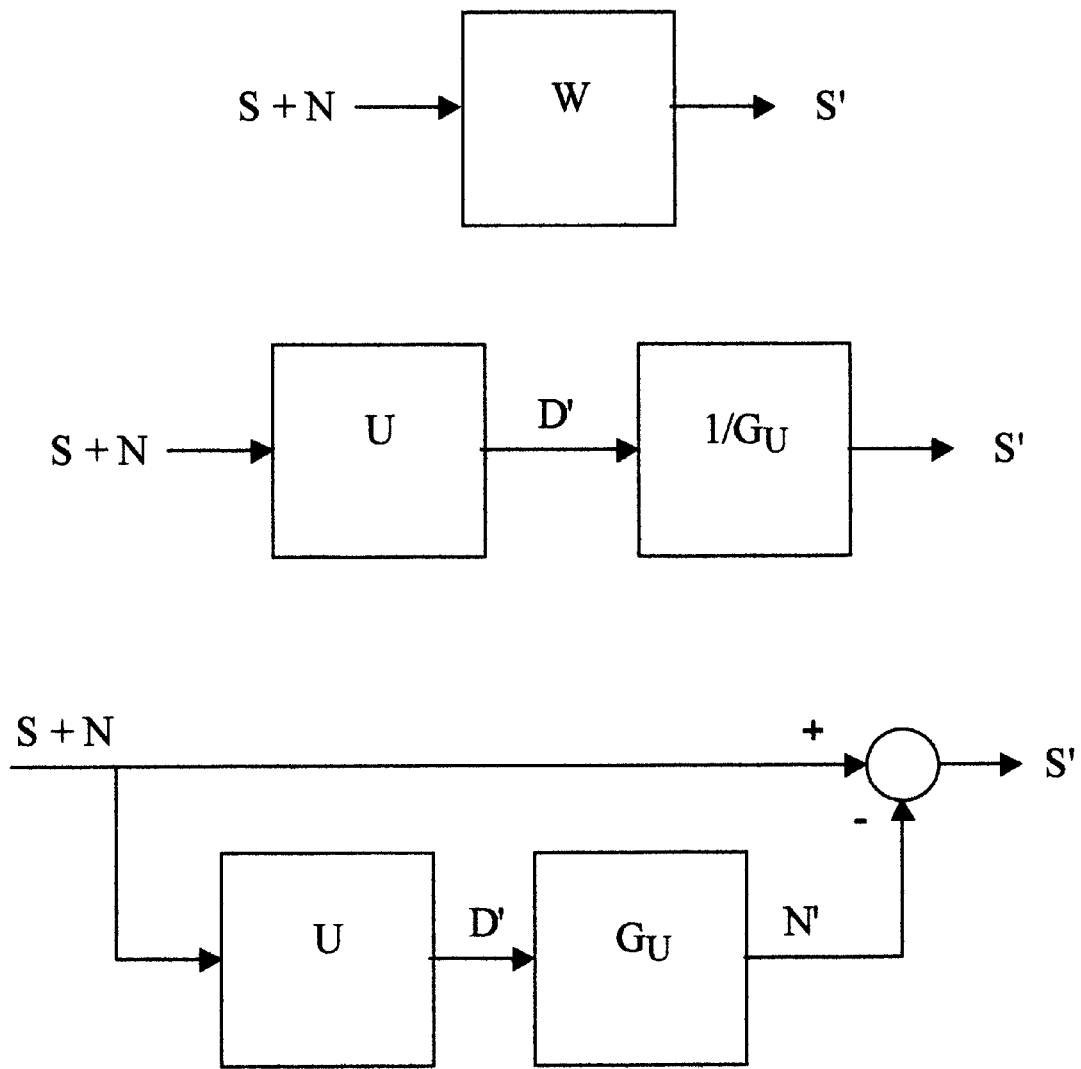
FIG. 12 is a block diagram illustrating methods of implementing the attribution process, uncertainty process, uncertainty task, and relevant inverse processes in accordance with the present invention.

FIG. 12a illustrates two representative methods of implementing an attribution process operating on an input S+N, to produce S'. In one example, U operates on the input to produce D' which is then operated upon by $1/G_u$ to produce S'. In another example, U operates on the input to produce D' which is then operated on by $G_u$ to produce N', which is then subtracted from the input to produce S'.

Figure 12B:
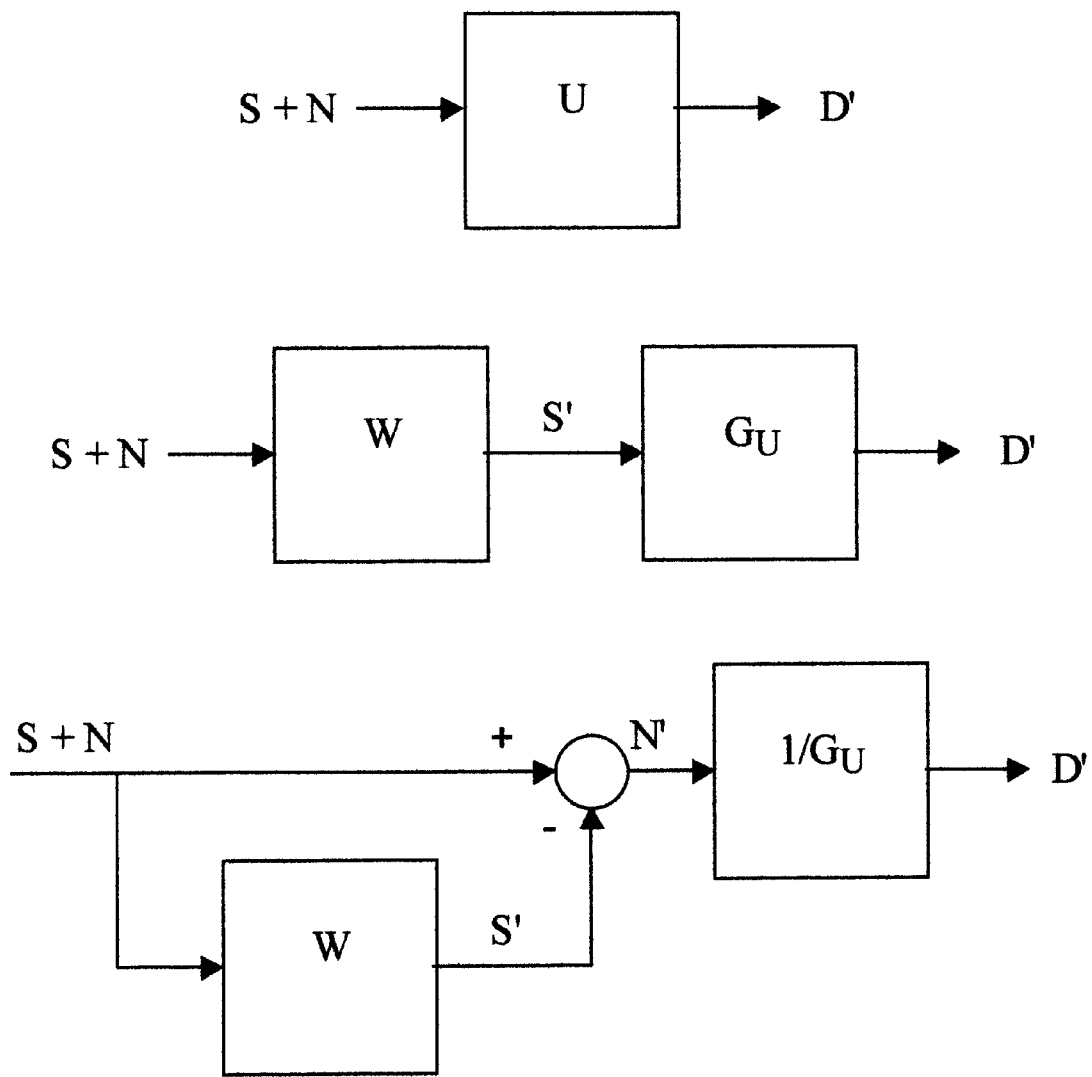

FIG. 12b illustrates two representative methods of implementing an uncertainty process operating on an input, S+N, to produce D'. In one example, W operates on the input to produce S' which is then operated on by $G_u$ to produce D'. In the other example, W operates on the input to produce S' which is then subtracted from the input to produce N', which is operated upon by $1/G_u$ to produce D'.

Figure 12C:
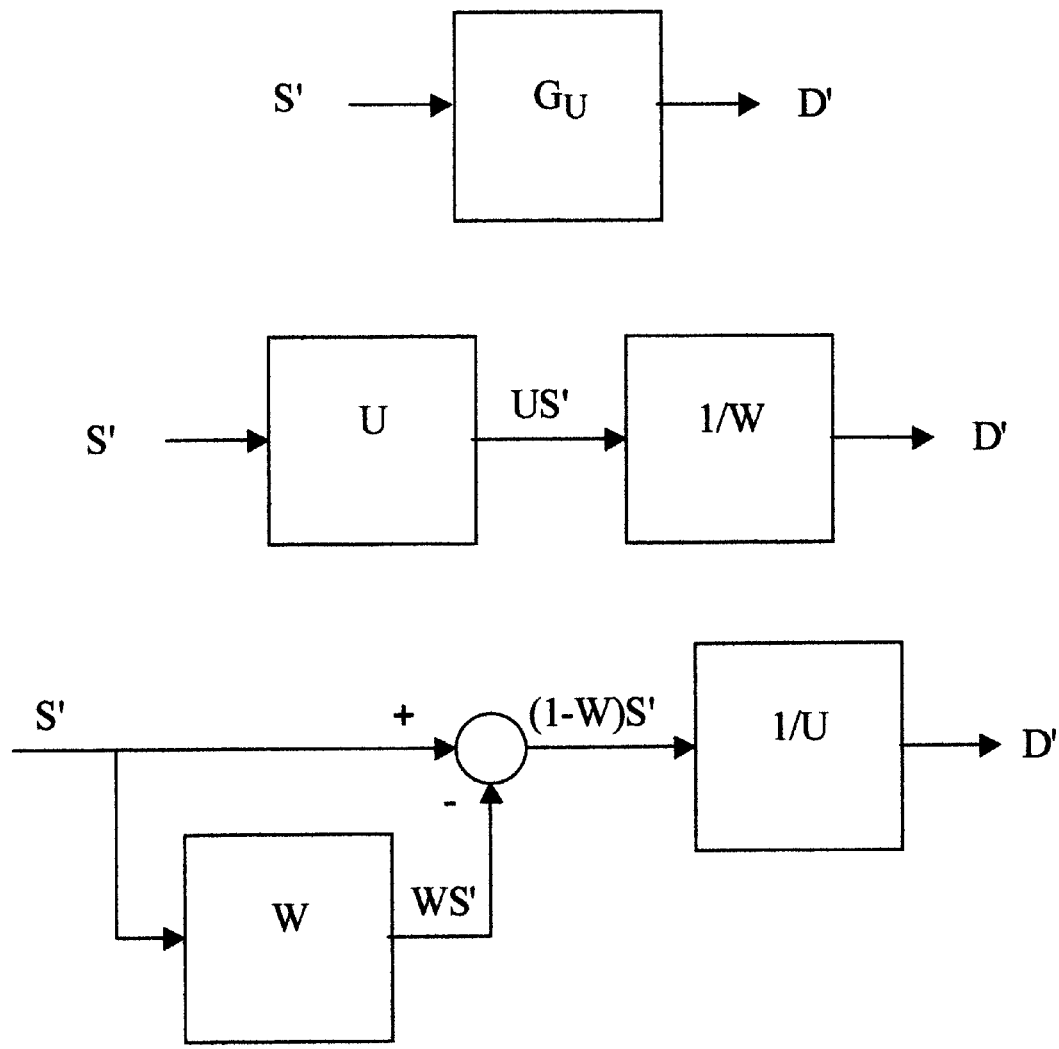

FIG. 12c illustrates two representative methods of implementing an uncertainty task operating on an input S', to produce D'. In one example, U operates on the input to produce US' which is then operated on by 1/W to produce D'. In the other example, W operates on the input to produce WS' which is then subtracted from the input to produce (1−W)S', which is operated upon by 1/U to produce D'.

Figure 12D:
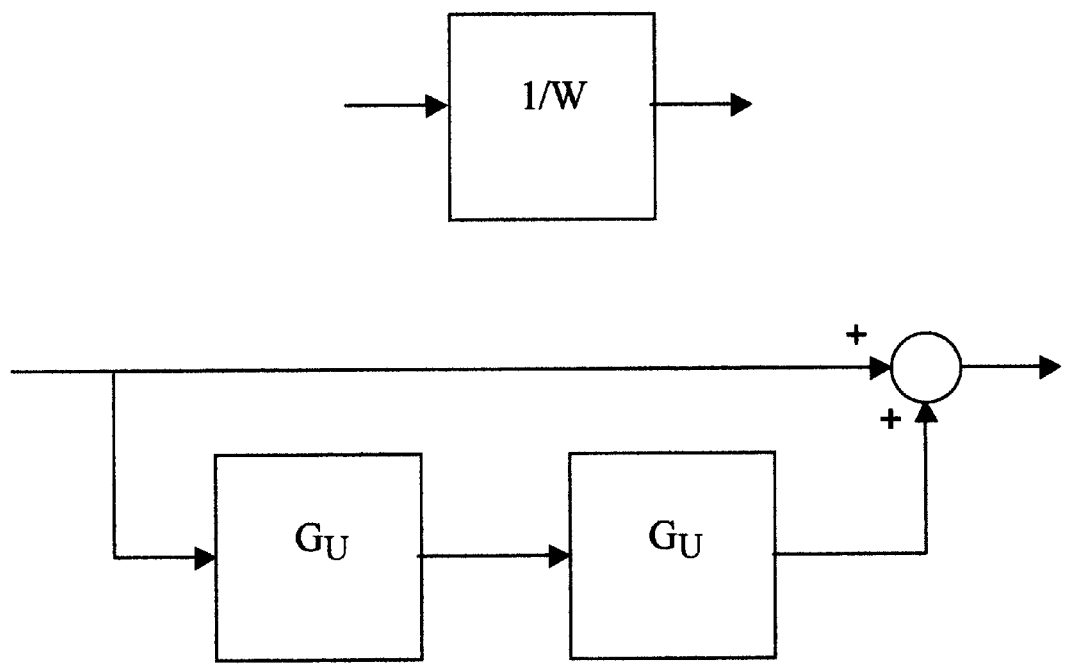

FIG. 12d illustrates a method of implementing an inverse attribution process. Such a process may be used as a intermediate process as described above. It may also be used to operate on a signal estimate or representation, S', to provide an estimate of signal and noise, (S+N)'. In the example shown, the equivalent of two stages of the uncertainty task, $G_u$ operates on the input and the result is added to the input.

Figure 12E:
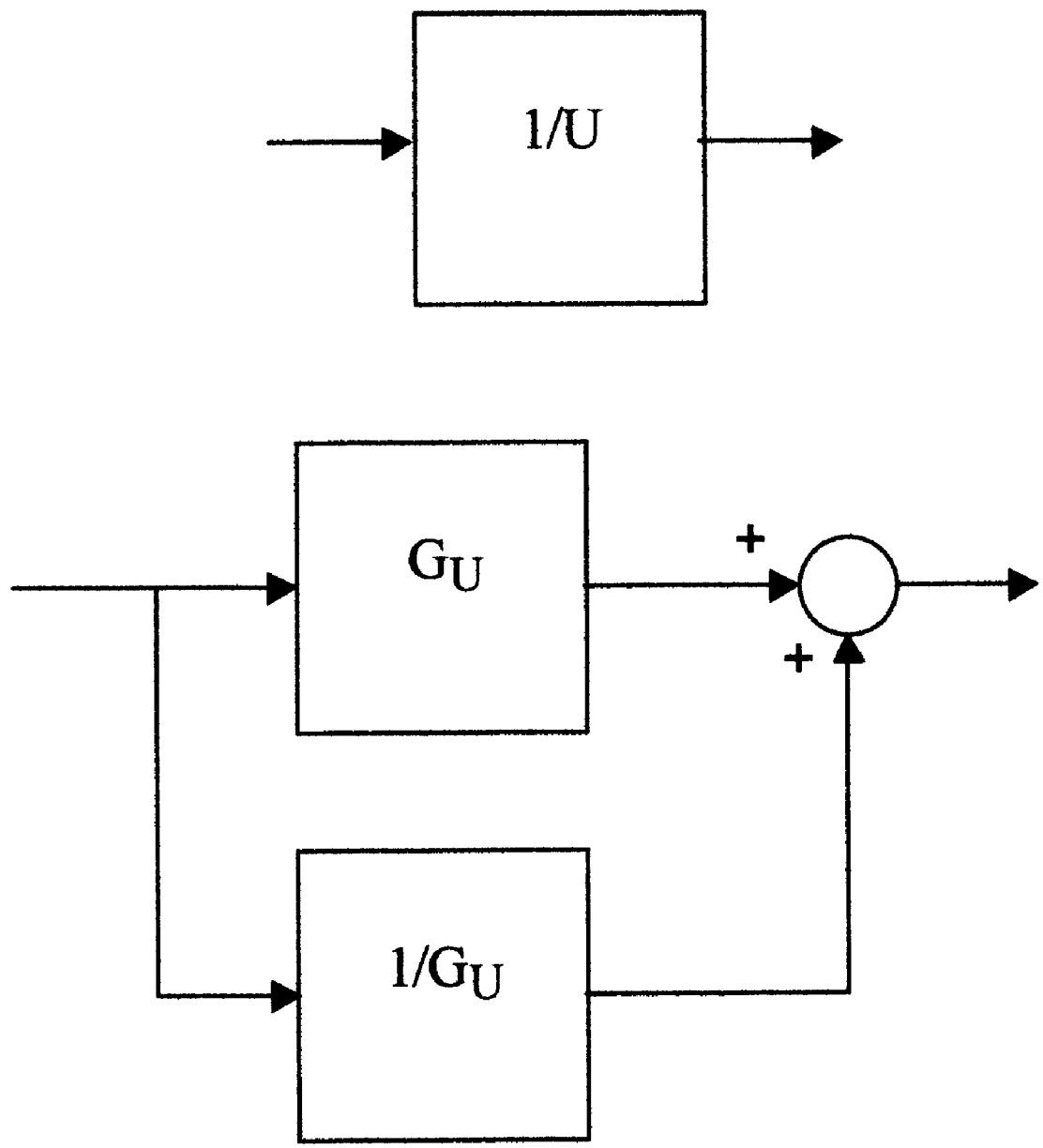

FIG. 12e illustrates a method of implementing an inverse uncertainty process. Such a process may be used as a intermediate process as described above. It may also be used to operate on an uncertainty signal, D', to provide an estimate of signal and noise, (S+N)'. In the example shown, $1/G_u$ and $G_u$ operate upon the input in parallel and the results are added.

Hardware and Software Implementations of the Embodiments of the Invention

The various embodiments of the inventive signal and image processing methods disclosed herein may be implemented in several forms. These include: (1) programming of a digital computer to implement the method steps as software based on the flow charts and processes described herein; (2) processing of input signals by circuitly of the type disclosed in the copending provisional application; and (3) processing of input signals by dedicated processing structures.

In practice, a computer system having a pentium-class central processor unit (CPU) that executes one or more software routines, preferably stored or storable in memory associated with the computer system, is sufficient to carry out the present invention. The CPU executes the routine(s) embodying one or more of the methods described herein. If desired, a general purpose programmable signal processor could be used instead of a computer system. Such signal processors are known to those skilled in the art and are commercially available from a number of vendors, Texas Instruments, Inc. for example.

Some additional comments on various embodiments and implementations of the present invention may be useful.

Ensemble-Average Power Spectra

To produce data representative of an ensemble-average power spectrum, the following procedures are suggested:

(1) choose a class of inputs (still images, for example);

(2) record data representative of a member of the input class with an appropriate sensor;

(3) sample the output of the sensor;

(4) convert the sampled data using an analog-to-digital converter (ADC);

(5) store a specified number of samples;

(6) perform a fast Fourier transform (FFT) on the stored data;

(7) square the absolute value of the FFT data to obtain an estimate of a power spectrum;

(8) store the estimated power spectrum;

(9) repeat steps (2) through (7) for another representative of the input class, modify step (7) so that the new estimated power spectrum is added to the data currently stored so that the stored data represents the sum of all estimated power spectra that have been computed;

(10) repeat the process until a desired number of members of the input class have been processed;

(11) divide the summed power spectra data by the number of iterations so that the result is representative of an average, the result being an estimate of the ensemble-average power spectrum for input class. The number of iterations required to obtain a reliable estimate of the ensemble-average power spectrum will vary depending on the input class, but fewer than 20 iterations will typically sufficient. A estimated power spectrum may also be obtained by fitting curves, splines, and/or analytic functions to the averaged power spectrum obtained by the steps listed above. A power spectrum may be normalized by dividing each data point by the sum over all data points.

If the input data exist originally in digital form, steps (1) through (5) are not required.

Estimates of ensemble-average power spectra for noise components can often be modeled based on knowledge of the nature of input data or knowledge of the characteristics of sensing devices, amplifiers, and other components. For example, the quantal randomness of photon capture can be modeled as a white noise process even though it is a form of intrinsic randomness. Most sensors have a thermal noise that can be recorded in the absence of an input signal to produce estimated power spectra as noted, or modeled based on information supplied by the manufacturer. Typically, sensor and amplifier noise can be modeled as a white noise process and/or a 1/f noise process. In the case where there is no way of reliably determining or characterizing noise, the noise preferably is modeled as white noise because there is no reason to suppose that any particular frequency range contributes to uncertainty any more than any other frequency range.

Processing Functions

In constructing digital representations of the processing functions W(v), U(v), and/or Gu(v), it should be noted that B(v) will take the form of a linear array or matrix of elements. The term $B^2(v)$ is obtained by squaring each element of B(v); i.e., B(v) is multiplied by B(v) element by element. Division operations should also be performed element-by-element. Similarly, an operation such as [1+B(v)] indicates that one should add 1 to each element of B(v).

As frequency domain representations, processing functions may be multiplied by FFT-versions of input data to yield desired results. Alternatively, inverse FFT operations may be performed on the frequency domain representations of the processing functions to yield a representation suitable for convolution operations.

Minimum-phase versions of processing functions may be obtained using the following procedures:

(1) constructing the processing function without regard to phase characteristics;

(2) taking the absolute value of the processing function;

(3) performing an inverse FFT;

(4) using a function such as rceps() available from The Mathworks, Inc. which returns a minimum-phase version of the inverse FFT. The minimum-phase result may be convolved with input data. Alternatively, one can calculate the FFT of the minimum-phase result to yield a minimum-phase frequency domain version of the processing function.

Data Processing

A preferred method of processing data according to the present invention is as follows:

(1) record data representative of a member of the input class with a sensor;

(2) sample the output of the sensor;

(3) convert the sampled data using an analog-to-digital converter (ADC);

(4) store a specified number of samples;

(5) perform a fast Fourier transform (FFT) on the stored data;

(6) multiply the FFT data, element by element, by a FFT-version (frequency domain representation) of a processing function;

(7) perform an inverse FFT on the result; and (8) repeat the process as desired.

Equivalently, data may be processed using the inventive method by performing steps (1) through (4) as above, and (5) convolving the stored data with an appropriate representation of the processing function.

Adaptation

The term $b^2$ as described herein is an "optimization parameter" representative of a ratio of noise variance to signal variance. There are several methods by which its value may be set.

In some cases, it is advantageous to allow a user to set the value of $b^2$. For example, a user may input a desired value to a computer program or control the value using a dial connected to a potentiometer. Such a method may be suitable in cases where a user desires to control the perceptual aspect of image, video, or audio data, for example.

In cases in which it is known or assumed that the r.m.s. power of noise is fixed or relatively constant, the value of $b^2$ may be estimated using the following procedures:

(1) calculating the r.m.s. value of the input data;

(2) squaring the r.m.s. input value to yield an estimate of the input variance;

(3) calculating the difference between the input variance and the known, estimated, or assumed noise variance to yield an estimate of the signal variance;

(4) calculating the ratio of the noise variance to the difference of variances.

In cases where the noise variance is known or assumed to be small with respect to the input variance, step (3) need not be performed and the input variance may be taken as an estimate of the signal variance. Those skilled in the art will recognize that an equivalent procedure may be used if the variance of the presumed signal component or input variance is known or expected to be fixed or relatively constant. Variances may also be estimated for digital data by determining the mean squared value of the data.

In the case of data derived from light, it is known that the random variation due to photon capture contributes a variance to the input in proportion to the mean light intensity. The variance of the "signal" component increases as the square of the mean light intensity. Thus, allowing for dark noise in a light sensor, the value of $b^2$ may be determined from the mean light intensity rather than from input variances, for example. Where photon randomness is the predominant source of "noise," the value of $b^2$ should be inversely proportional to a linear function of light intensity. Where other noise sources having a fixed r.m.s. power dominate, $b^2$ should be inversely proportional to a function of light intensity squared. The mean light intensity may be estimated by means of a low-pass filter connected to a light sensor, or by other means of averaging.

In other cases, the value of $b^2$ may be set by a method of minimizing the r.m.s. value of the uncertainty signal with respect to the r.m.s. value of the input. One such method preferably carries out the following steps:

(1) recording and storing an input;

(2) selecting an initial value of $b^2$;

(3) processing the input by the inventive method to produce an uncertainty signal;

(4) forming and storing a ratio of the r.m.s. value of the uncertainty signal to the r.m.s. value of the input;

(5) selecting a new value of $b^2$;

(6) producing a new uncertainty signal;

(7) forming a new ratio of r.m.s. values;

(8) comparing the first ratio to the second ratio; if the new value of $b^2$ is greater than the first value and if the value of the second ratio is greater than that of the first ratio, then a new, lesser value of $b^2$ needs to be selected and the process repeated until a value of $b^2$ is found such that any increase or decrease in its value results in a greater ratio of r.m.s. values. Those skilled in the art will recognize that algorithms are known with which to search for a minimum value.

Data Manipulation

As noted, the present invention advantageously provides a means of extracting features from data based on the value of an uncertainty signal. For example, regions near the eyes, nose, mouth, hairline, and outline of a face may be preferentially extracted from an image of a face by retaining values of an uncertainty signal which exceed a certain limit. One method of achieving feature extraction preferably includes the following steps:

(1) obtaining input data;

(2) producing an uncertainty signal;

(3) normalizing the uncertainty signal by its standard deviation;

(4) comparing the absolute value of the uncertainty signal to a set level;

(5) storing the value 1 at each point at which the threshold is exceeded and the value of 0 wherever it is not.

A threshold value in the range of 1 to 3 works well for images of faces. The non-zero values in the resulting binary map tend to mark locations of maximum ambiguity or uncertainty. For images, these areas tend to be perceptually significant and useful in recognition processes. The map may be multiplied by the input data or a signal representation so that only those areas of the input or signal data corresponding to a 1 in the binary map are preserved. Alternatively, the binary map may be multiplied by the uncertainty signal. The result may be processed by the inverse uncertainty task of the inventive method to produce a representation of a signal only in those areas corresponding the large magnitude values of the uncertainty signal. An additional step of quantizing the uncertainty signal may be included before or after the threshold comparison.

The feature-extraction method may be used in conjunction with subsampling/interpolation operations so that data corresponding to larger values of the uncertainty signal are preferentially retained. As an example, having obtained an uncertainty signal, the following steps preferably are carried out:

(1) produce a binary map representing location at which the absolute value of the uncertainty signal exceeds a defined limit;

(2) multiply the binary map by the uncertainty signal and store the result;

(3) subsample the uncertainty signal by averaging neighboring elements so that the result has fewer elements than the original uncertainty signal;

(4) interpolate the subsampled uncertainty signal so that the result has the same number of elements as the original;

(5) multiply the result by a binary map produced by performing a NOT operation on the original binary map;

(6) add the result to the stored product of the original binary map and the original uncertainty signal.

Additionally, the result may be processed by an inverse uncertainty task of the inventive method to produce a representation of a signal in which the details near locations of large uncertainty signal values are preferentially preserved. The steps described may be used in a pyramidal method in which certain areas of an uncertainty signal are preserved at each level of resolution.

A similar method of preferentially preserving resolution in certain areas involves adjusting a sampling rate or density in accordance with the value of the uncertainty signal. For example, an absolute value of an uncertainty signal may be used as a parameter in a linear function which determines the inter-sample duration so that input, signal, or uncertainty data are sampled at the end of each duration period. Provided the sample duration decreases with increasing absolute value of the uncertainty signal, data will be sample at a higher rate near locations of large magnitude values of the uncertainty signal. The duration period may be set by the value of the uncertainty signal at the end of the preceding interval, or by the average absolute value of the during the preceding interval, for example. Methods of this kind may also preserve the sign of the uncertainty signal so that negative values and positive values do not have the same effect.

Another method of controlling resolution and quality, having obtained an uncertainty signal, preferably involves the following steps:

(1) determining the mean absolute value or variance of the uncertainty signal with respect to a certain duration or area;

(2) setting an effective bandwidth as a function of the result of step 1;

(3) processing data in accordance with the criterion of step (2) so that only a certain bandwidth of the processed data is preserved. As examples of step (2), the mean absolute value may correspond in a linear manner to the low-frequency cut-off of a high-pass filter, or it may correspond to the high-frequency cut-off of a low-pass filter. Equivalently, in basis-function methods, such as JPEG, the uncertainty signal may be used to control the number of coefficients to be preserved in a certain duration or area of processed data. In wavelet-based methods, the range of allowed scaling factors may be controlled.

To recapitulate, the present invention provides a method of analyzing and representing data which can be used to evaluate the ambiguity or error introduced by a particular signal and noise model of the data. This permits computationally efficient representation and manipulation of data without the introduction of bias from assumptions as to the nature of the data or relationships between different pieces of data. The inventive method is of particular use in data compression and transmission, as well as the processing of image data to emphasize or de-emphasize specific features.

The terms and expressions herein are used as terms of description and not of limitation, and there is no intention in the use of such terms and expressions of excluding equivalents of the features shown and described, or portions thereof, it being recognized that various modifications are possible within the scope of the invention claimed. Thus, modifications and variations may be made to the disclosed embodiments without departing from the subject and spirit of the invention as defined by the following claims.

What is claimed is:

1. A method of processing a set of input data $X(v)$ representing a desired signal component plus an undesired contamination component, the method comprising the following steps:

obtaining an ensemble-averaged power spectrum of the signal component, $<|K_s(v)|^2>$;

obtaining an ensemble-averaged power spectrum of the contamination component, $<|K_N(v)|^2>$;

forming a term $B^2=<|K_N(v)|^2>/<|K_S(v)|^2>$;

forming a filter function W(v), where $|W(v)|=[1+b^2 B(v)^2]^{-1}$, and b is greater than zero;

forming a term U(v), where $|U(v)|=[W(v)(1-W(v))]^{1/2}$; and processing X(v) to form a result U(v) X(v).

2. The method of claim 1, wherein the step of obtaining an ensemble-averaged power spectrum of the signal component, further comprises:

averaging a set of data known to represent the signal component of the set of input data.

3. The method of claim 1, wherein the step of obtaining an ensemble-averaged power spectrum of the contamination component, further comprises at least one step selected from a group consisting of (i) assuming a model for the contamination component and determining its ensemble-averaged power spectrum, and (ii) assuming a model for the contamination component that is a representation of white noise.

4. The method of claim 1, further comprising at least one step selected from a group consisting of (i) further processing the result U(v) X(v) by applying a desired signal processing technique, and (ii) quantizing the result U(v) X(v).

5. The method of claim 1, further including the step of quantizing the result U(v) X(v), wherein said quantizing includes at least one step selected from a group consisting of (i) comparing the result to a set of reference values determined from the result's ensemble average probability density function and generating a quantization value for the result corresponding to a member of the set of reference values, and (ii) comparing the result to a set of reference values determined from a model of an ensemble average probability density function and generating a quantization value for the result corresponding to a member of the set of reference values.

6. The method of claim 1, wherein $b^2$ is inversely proportional to $[a_1+I^n]$, where $a_1$ is a constant, I is a mean value of the signal, and n is an integer.

7. The method of claim 1, wherein the set of input data is representative of visual image data.

8. A method of processing data representative of visual images, the method comprising the following steps:

forming a filter function W(v), where $|W(v)|=[1+b^2 B(v)^2]^{-1}$, $b^2$ is a constant selected to satisfy $|W(v)|<1$ for all v, and B(v) is proportional to v;

forming a term U(v), where $|U(v)|=[W(v)(1-W(v))]^{1/2}$; and processing X(v) to form result U(v) X(v).

9. The method of claim 8, further comprising at least one step selected from a group consisting of (i) further processing the result U(v) X(v) by applying a desired signal processing technique, and (ii) providing the result U(v) X(v) as a control term to vary amplitude spectrum of the function filter function W(v).

10. The method of claim 9, further comprising at least one step selected from a group consisting of (i) quantizing the result U(v) X(v), (ii) quantizing the result by comparing the result to a set of reference values determined from the result's ensemble average probability density function and generating a quantization value for the result corresponding to a member of the set of reference values, and (iii) quantizing the result U(v) X(v) by comparing the result to a set of reference values determined from a model of an ensemble average probability density function and generating a quantization value for the result corresponding to a member of the set of reference values.

11. The method of claim 9, wherein $b^2$ is inversely proportional to $[a_1+I^n]$, where $a_1$ is a constant, I is a mean value of the signal, and n is an integer.

12. A method of characterizing a data processing operation which processes input data X to form a result Y, comprising the following steps:

forming a function W, where $|W|$ is proportional to $|Y|/|X|$;

forming a function U, where $|U|$ is equal to $[|W|(1-|W|)]^{1/2}$; and applying the function U to the input data X to obtain the result U(v) X(v).

13. The method of claim 12, wherein input data X is representative of visual image data.

14. The method of claim 12, including a step of further processing the result U(v) X(v) using at least one technique selected from a group consisting of (i) applying a desired signal processing technique, (ii) providing the result U(v) X(v) as a control term to vary amplitude spectrum of the function filter function W(v), (iii) quantizing the result U(v) X(v), (iv) quantizing the result U(v) X(v) by comparing the result to a set of reference values determined from the result's ensemble average probability density function and generating a quantization value for the result corresponding to a member of the set of reference values, and (v) quantizing the result U(v) X(v) by comparing the result to a set of reference values determined from a model of an ensemble average probability density function and generating a quantization value for the result corresponding to a member of the set of reference values.

15. A method of characterizing a data processing operation that processes input data X to form a result Y, comprising the following steps:

forming a function W, where $|W|$ is proportional to $|Y|/|X|$;

forming a function Z, where $|Z|$ is equal to $[(1-|W|)/|W|]^{1/2}$; and applying the function Z to the output data Y to obtain the result Z(v) Y(v).

16. The method of claim 15, wherein input data X is representative of visual image data.

17. The method of claim 15, further comprising the step of: further processing the result Z(v) Y(v) using at least one step selected from a group consisting of (i) applying a desired signal processing technique to the result Z(v) Y(v), (ii) providing the result Z(v) Y(v) as a control term to vary amplitude spectrum of the function filter function W(v), (iii) quantizing the result Z(v) Y(v), (iv) quantizing the result Z(v) Y(v) by comparing the result to a set of reference values determined from the result's ensemble average probability density function and generating a quantization value for the result corresponding to a member of the set of reference values, (iv) quantizing the result Z(v) Y(v) further by comparing the result to a set of reference values determined from a model of an ensemble average probability density function and generating a quantization value for the result corresponding to a member of the set of reference values.

18. A signal processing system, comprising:

a data input node for inputting a signal X to be processed;

a digital computing apparatus including at least a central processor unit and memory programmed to operate on an input signal to implement operations of:

forming a first processing function W, wherein the amplitude spectrum W(v) is given by $$W(v)=(1+b^2B(v)^2)^{-1};$$

where b is a constant and B(v) is a positive, real valued function of frequency;

forming a second processing function U having an amplitude spectrum given by $$[|W|(1-|W|)]^{1/2};$$

applying the second processing function U to the input data;

performing a desired signal processing operation on the result of applying the second processing function U to the input data; and a display device for displaying a result of operations implemented by said digital computing apparatus.

19. The signal processing system of claim 18, wherein input signal X is representative of visual image data.

20. The signal processing system of claim 18, wherein B(v) has at least one characteristic selected from a group consisting of (i) B(v) is proportional to v, (ii) $B^2(v)$ is proportional to $[a_1+v^n]/[a_2+v^m]$ where $a_1$ and $a_2$ are constants and n and m are integers, (iii) $B^2(v)$ is represented by vector [0 ... 0 −1 2 −1 0 ... 0] where ellipses represent any number of zeros, and (iv) where a>0 and $B^2(v)$ is represented by a matrix:

$$\begin{bmatrix} 0 & \cdots & \cdots & \cdots & \cdots & \cdots & \cdots & 0 \\ \vdots & \ddots & \cdots & \cdots & \cdots & \cdots & \cdots & \vdots \\ \vdots & \vdots & 0 & \cdots & \cdots & \cdots & 0 & \vdots & \vdots \\ \vdots & \vdots & \vdots & -a & -1 & -a & \vdots & \vdots & \vdots \\ \vdots & \vdots & \vdots & -1 & 4(1+a) & -1 & \vdots & \vdots & \vdots \\ \vdots & \vdots & \vdots & -a & -1 & -a & \vdots & \vdots & \vdots \\ \vdots & \vdots & 0 & \cdots & \cdots & \cdots & 0 & \vdots & \vdots \\ \vdots & \cdots & \cdots & \cdots & \cdots & \cdots & \cdots & \ddots & \vdots \\ 0 & \cdots & \cdots & \cdots & \cdots & \cdots & \cdots & 0 \end{bmatrix}$$

21. A method of processing a signal, comprising the following steps:

providing a signal generated by a stochastic process, the signal including a stochastic source component and a random process component;

inputting the signal to a filter having an amplitude spectrum $W_1(v)$, where v is a frequency component of the signal, the filter output representing a weighting of the frequency component a greater amount if it is more likely attributable to the stochastic source than to the random process; and weighting the output of the filter by a function having an amplitude spectrum $W_2(v)$, where $W_2(v)$ is given by $$[(1-W_1(v))/W_1(v)]^{1/2}.$$

22. The method of claim 21, further comprising the step of:

providing the weighted output of the filter as a control signal to vary the amplitude spectrum of the filter, wherein the control signal has an expectable power spectrum proportional to $|W_1(v)W_2(v)|$.

23. The method of claim 21, further comprising the step of quantizing an output of the filter so controlled.

24. The method of claim 21, wherein amplitude spectrum $W_1(v)$ is represented by $W_1(v)=[1+b^2B(v)^2]^{-1}$, where b is a constant and B(v) is a positive, real valued function of frequency.

25. The method of claim 24, wherein B(v) is proportional to $v^{\pm n}$, where n is an integer.

26. A signal processor, comprising:

means for inputting data X(v) representing a desired signal component plus an undesired contamination component;

filter means for filtering the data so input, the filter means having an amplitude spectrum W(v), where $|W(v)|=[1+b^2B(v)^2]^{-1}$, B(v) is a positive, real valued function, and b is a positive number;

means for weighting an output of the filter means by U(v), where $|U(v)|=[W(v)(1-W(v))]^{1/2}$;

means for providing a weighted output of the filter means as a control signal to vary amplitude spectrum of the filter means; and means for processing X(v) to form the result U(v) X(v).

27. The signal processor of claim 26, wherein B(v) is proportional to $v^{\pm n}$, where n is an integer.

28. The signal processor of claim 26, wherein the filter means includes a resistive network having an adjustable parameter which is varied by a control signal.

29. The signal processor of claim 28, wherein the adjustable parameter is a ratio of sheet resistance to shunt resistance.

30. A method of enhancing regions of an image in which contrast discontinuities are present, the image formed from a plurality of signals generated by a stochastic process, wherein each signal includes a stochastic source component and a random process component, the method comprising the following steps:

weighting the signals by a filter function having an amplitude spectrum $W_1(v)$, where v is a frequency component of the signal, the amplitude spectrum acting to selectively weight the frequency component greater if it is more likely attributable to the stochastic source than to the random process;

weighting the output of the filter function by a function having an amplitude spectrum W2(v), where $W_2(v)$ is given by $$[(1-W1(v))/W_1(v)]^{1/2}; \text{ and}$$

adding a result of weighting output of the filter function by $W_{2(v)}$ to output of the filter function to form components of an enhanced image.

31. The method of claim 30, wherein amplitude spectrum $W_1(v)$ is given by $$W_1(v)=(1+b^2B(v)^2)^{-1},$$

where b is a constant and B(v) is a positive, real valued function of frequency.

32. The method of claim 30, wherein B(v) is proportional to $v^{\pm n}$, where n is an integer.

* * * * *

UNITED STATES PATENT AND TRADEMARK OFFICE
CERTIFICATE OF CORRECTION

PATENT NO. : 6,014,468
DATED : January 11, 2000
INVENTOR(S) : Sean T. McCarthy and William G. Owen It is certified that error appears in the above-identified patent and that said Letters Patent is hereby corrected as shown below:

Column 11,
Line 58, delete equation and insert -- $|X(v)|^2 = |S'(v)|^2 + 2|S'(v)||N'(v)|\cos(\theta_{S'}(v) - \theta_{N'}(v)) + |N'(v)|^2.$ --

Column 19,
Line 26, delete equation and insert -- $\sigma_X^2 = \langle \sigma_X^2 \rangle + \delta\sigma_X^2.$ --

Line 29, delete entire equation and insert -- $\sigma_S^2 = \langle \sigma_S^2 \rangle + \delta\sigma_S^2$ and $\sigma_N^2 = \langle \sigma_N^2 \rangle + \delta\sigma_N^2.$ --

Column 21,
Line 14, delete entire equation and insert -- $B^2 = \langle |K_N(v)^2| \rangle / \langle |K_S(v)^2| \rangle$ and $b^2 = \langle \sigma_N^2 \rangle / \langle \sigma_S^2 \rangle.$ --

Lines 16-17, after "combination of", delete equation through "$B^2$", Line 17, and insert -- $|X(v)|^2, |X_N(v)|^2, \langle \sigma^2_X \rangle, \langle \sigma^2_S \rangle, \langle \sigma^2_N \rangle, \langle |K_X(v)|^2 \rangle, \langle |K_S(v)|^2 \rangle, \langle |K_N(v)|^2 \rangle, b^2,$ or $B^2$ --

Line 23, after "defining" and before "may be used", delete equation and insert -- $|W(v)|, |U(v)|,$ or $|G_U(v)|$ --

Line 63, delete equation and insert -- $\xi^2 = \langle \xi^2 \rangle + \delta\xi^2$ --

Line 64, after "shown that", delete equation and insert -- $\langle \sigma_D^2 \rangle = \langle \xi^2 \rangle.$ --

Column 25,
Line 40, delete equation and insert -- $\langle |X'_s(v)|^2 \rangle = |W(v)| \langle |X_s(v)|^2 \rangle$ --
Line 49, delete equation and insert -- $\langle |X'_s(v)|^2 \rangle + \langle |D(v)|^2 \rangle = \langle |X_s(v)|^2 \rangle$ --

Column 26,
Line 55, before "may be", delete equation and insert -- $(\langle \xi_Q^2 \rangle)$ --

Column 27,
Line 1, after "Let", delete equation and insert -- $\Delta\xi_n^2$ --

Line 14, after "such that", delete equation and insert -- $\Delta\xi_n^2 + \Delta\xi_{n-1}^2$ --

Line 29, after "signal", delete equation and insert -- $\beta^2 = \sigma_D^2 / 2.$ --

UNITED STATES PATENT AND TRADEMARK OFFICE
CERTIFICATE OF CORRECTION

PATENT NO.    : 6,014,468
DATED         : January 11, 2000
INVENTOR(S)   : Sean T. McCarthy and William G. Owen It is certified that error appears in the above-identified patent and that said Letters Patent is hereby corrected as shown below:

<u>Column 31,</u>
Line 57, delete equation and insert $-- \left( |W(v)| \left(1 - |W(v)|\right) \right)^{1/2}, --$ <u>Column 34,</u>
Line 21, change "circuitly" to -- circuitry --.

Signed and Sealed this

Sixteenth Day of July, 2002

*Attest:*

*Attesting Officer*

JAMES E. ROGAN
*Director of the United States Patent and Trademark Office*